US011695815B1

(12) United States Patent
Mekuria et al.

(10) Patent No.: US 11,695,815 B1
(45) Date of Patent: Jul. 4, 2023

(54) METHOD AND SYSTEM FOR REDUNDANT MEDIA PRESENTATION GENERATION

(71) Applicant: CodeShop, B.V., Amsterdam (NL)

(72) Inventors: Rufael Mekuria, Amsterdam (NL); Arjen Wagenaar, Amsterdam (NL); Dirk Griffioen, Arnhem (NL)

(73) Assignee: CodeShop, B.V., Amsterdam (NL)

( * ) Notice: Subject to any disclaimer, the term of this patent is extended or adjusted under 35 U.S.C. 154(b) by 0 days.

(21) Appl. No.: 18/075,837

(22) Filed: Dec. 6, 2022

(51) Int. Cl.
*G06F 11/10* (2006.01)
*H04L 65/60* (2022.01)
*H04L 67/02* (2022.01)

(52) U.S. Cl.
CPC .............. *H04L 65/60* (2013.01); *H04L 67/02* (2013.01)

(58) Field of Classification Search
USPC .......................................................... 709/231
See application file for complete search history.

(56) References Cited

U.S. PATENT DOCUMENTS

| | | | |
|---|---|---|---|
| 7,667,780 | B2 | 2/2010 | Weiss |
| 7,885,340 | B2 | 2/2011 | Greenbaum et al. |
| 9,060,201 | B2 | 6/2015 | Labrozzi et al. |
| 9,374,604 | B2 | 6/2016 | Nemiroff et al. |
| 9,532,099 | B2 | 12/2016 | Lawrence et al. |
| 9,794,313 | B2 | 10/2017 | Lammers et al. |
| 10,154,320 | B2 | 12/2018 | Labrozzi et al. |
| 10,313,710 | B1 | 6/2019 | Karlsson et al. |
| 10,412,695 | B2 | 9/2019 | Dang et al. |
| 10,454,604 | B2 | 10/2019 | Elliot et al. |
| 10,652,625 | B1 | 5/2020 | Saxton et al. |
| 11,057,633 | B2 | 7/2021 | Syed et al. |

(Continued)

FOREIGN PATENT DOCUMENTS

WO WO2013/144347 A1 10/2013

OTHER PUBLICATIONS

ISO/IEC 23009-1: Draft Third Edition Jul. 26, 2018 Information technology—Dynamic adaptive streaming over HTTP (DASH)—Part 1:Media presentation description and segment formats.

(Continued)

*Primary Examiner* — Jude Jean Gilles
(74) *Attorney, Agent, or Firm* — Pablo Meles

(57) ABSTRACT

A system, apparatus and method for distributed adaptive streaming packaging can include a plurality of distributed adaptive streaming packagers having one or more processors configured to perform the functions of identifying one or more media segments in one or more input signals, identifying one or more latest media segment presentation times in the one or more media segments, Identifying one or more latest media segment presentation durations in the in the one or more media segments, adding each of the one or more latest media segment presentation times to each of the one or more latest media segment presentation durations in the input signal to compute one or more calculated publish times. The system or method can further include choosing one of the one or more publish times as the media presentation publish time and generating a media presentation based on the media presentation publish time. In some embodiments, the method can set MPD@publishTime to the media presentation publish time or set #EXT-X-PROGRAM-DATE-TIME tag to the media presentation publish time.

20 Claims, 11 Drawing Sheets

(56) References Cited

U.S. PATENT DOCUMENTS

| | | | | |
|---|---|---|---|---|
| 11,063,999 | B2 | 7/2021 | Bomfim et al. | |
| 2008/0270905 | A1* | 10/2008 | Goldman | G06F 9/453 715/721 |
| 2011/0138020 | A1* | 6/2011 | Pantos | H04L 65/756 709/219 |
| 2011/0246622 | A1* | 10/2011 | Pantos | H04L 67/02 709/219 |
| 2011/0246623 | A1* | 10/2011 | Pantos | H04L 65/756 709/219 |
| 2011/0252118 | A1* | 10/2011 | Pantos | G06F 3/0484 709/219 |
| 2018/0176278 | A1* | 6/2018 | Mandyam | H04L 65/70 |
| 2019/0036995 | A1* | 1/2019 | Zhang | H04L 67/02 |

OTHER PUBLICATIONS

ISO/IEC 14496-12: Fifth edition Dec. 15, 2015 Information technology—Coding of audiovisual objects—Part 12: ISO base media file format.
ISO/IEC 23000-19:2018 Information technology—Multimedia application format (MPEG-A)—Part 19: Common media application format (CMAF) for segmented media.

* cited by examiner

200

300

Cloud Environment

MPEG DASH Example

```
<?xml version="1.0" encoding="utf-8"?><MPD xmlns:xsi="http://www.w3.org/2001/XMLSchema-instance" xmlns="urn:mpeg:dash:schema:mpd:2011"
xsi:schemaLocation="urn:mpeg:dash:schema:mpd:2011 http://standards.iso.org/ittf/PubliclyAvailableStandards/MPEG-DASH_schema_files/DASH-MPD.xsd" type="dynamic"
availabilityStartTime="1970-01-01T00:00:00Z" publishTime="2022-11-22T14:35:29.289085Z" minimumUpdatePeriod="PT2S" timeShiftBufferDepth="PT10M"
maxSegmentDuration="PT2S" minBufferTime="PT10S" profiles="urn:mpeg:dash:profile:isoff-live:2011,urn:com:dashif:dash264">
<Period id="1" start="PT0S">
<BaseURL>dash/</BaseURL>
 <AdaptationSet id="1" group="1" contentType="audio" lang="en" minBandwidth="64000" maxBandwidth="128000" segmentAlignment="true"
audioSamplingRate="48000" mimeType="audio/mp4" codecs="mp4a.40.2" startWithSAP="1">
<AudioChannelConfiguration schemeIdUri="urn:mpeg:dash:23003:3:audio_channel_configuration:2011" value="1" />
<Role schemeIdUri="urn:mpeg:dash:role:2011" value="main" /> <SegmentTemplate timescale="48000" initialization="live-$RepresentationID$.dash" media="live-
$RepresentationID$-$Time$.dash">
<!-- 2022-11-22T14:25:28.320000Z / 1669127128 - 2022-11-22T14:35:29.280000Z --> <SegmentTimeline> <S t="80118102159360" d="92160" r="312" /> </
SegmentTimeline> </SegmentTemplate>
<Representation id="audio_eng=64000" bandwidth="64000"> </Representation> <Representation id="audio_eng=128000" bandwidth="128000"> </
Representation>
</AdaptationSet>
<UTCTiming schemeIdUri="urn:mpeg:dash:utc:http-iso:2014" value="https://time.akamai.com/?iso" />
</MPD>
```

HTTP Live Streaming Example

1000

```
#EXTM3U#EXT-X-VERSION:4##
EXT-X-MEDIA-SEQUENCE:869336842#EXT-X-I-FRAMES-ONLY
#EXT-X-TARGETDURATION:2
#X-TIMESTAMP-MAP:MPEGTS=630879904,LOCAL=2022-11-22T14:18:54.720000Z
#EXT-X-PROGRAM-DATE-TIME:2022-11-22T14:18:54.720000Z
#EXTINF:1.92, no desclive-video=500000-869336842.ts
#EXTINF:1.92, no desclive-video=500000-869336843.ts
#EXTINF:1.92, no desclive-video=500000-869336844.ts
#EXTINF:1.92, no desclive-video=500000-869336845.ts
```

CMAF Media Track Example

1100

METHOD AND SYSTEM FOR REDUNDANT MEDIA PRESENTATION GENERATION

CROSS-REFERENCE TO RELATED APPLICATIONS

Not applicable.

STATEMENT REGARDING FEDERALLY-SPONSORED RESEARCH OR DEVELOPMENT

Not applicable.

INCORPORATION BY REFERENCE

Not applicable.

FIELD

The teachings in accordance with the exemplary embodiments relate generally to streaming media, and more particularly to redundant and distributed generation of streaming media presentations.

DESCRIPTION OF THE RELATED ART

This section provides a background or context to the various embodiments that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Content in digital format is increasingly popular. Users are often downloading or streaming such content from a remote service. Internet protocol video delivery using an Adaptive Streaming protocol provides many advantages over traditional delivery. It can be used to implement live, catch-up and on-demand services and reach devices with different network connectivity properties operating in different conditions such as in mobile networks.

Because different client devices require the content to be in specific formats and-or bit-rates/qualities, the remote service will often perform tasks such as video encoding, packaging and generating MPEG-DASH, HTTP Live Streaming and Common Media Application Format Media presentations that are made available for adaptive streaming over HTTP(S). Example formats generated include MPEG-DASH as defined by ISO/IEC 23009-1 and HTTP Live Streaming published by the Internet Engineering Task Force as RFC 8216 or Smooth streaming published and maintained by Microsoft corporation or the Common Media application format defined in ISO/IEC 23000-19. Each of these formats provide the benefits of adaptive streaming delivery and rely on adaptive streaming transcoders and packagers to generate the target output formats for adaptive streaming. Remote services may be composed of various streaming components including adaptive streaming transcoders and packagers. A key functionality is the generation of media presentation description or media playlist and segmentation into individually downloadable segments, herein referred to as redundant media presentation generation. Media presentations may be an HTTP Live Streaming presentation or an MPEG-DASH media presentation description.

Such a remote service may be implemented in a distributed manner. Such distributed components are deployed on server hardware that exists on premise or in cloud-based servers and include one or more distributed encoder/transcoder and packager entities that jointly create the media streaming presentation representing a live program feed. In such scenarios the distributed encoder/transcoder creates the adaptive bit-rate encoding and the packager may be used to generate the output tracks as a combination of initialization segments and media segments.

Examples of cloud service providers include AWS EC2 provided by Amazon web services, Google cloud, Microsoft Azure, Alibaba Cloud or Tencent cloud. Also, more cloud services offered by smaller providers are becoming available rapidly, and these may be used to implement the techniques described herein. Such privately or publicly hosted clouds can be offered based on cloud operating systems such as provided by organization such as OpenStack foundation or VMWare or other providers of cloud operating system and virtualization technologies. Cloud operating systems may use various virtualization technologies including container-based approaches and hypervisor-based virtualization to offer instances for distributed deployments. This gives a lot of flexibility to service offerings enabling them to deploy one or more instances with different sizes based on actual resource demands.

In conventional approaches, upstream content generators provide the sources to transcoders and will place timestamps (timing information) corresponding to the video frames. Adaptive Streaming transcoders, transcode the content to different representations with different bit-rates and segment boundaries, which should enable seamless switching between representations. The segment boundaries are placed and represented by an earliest presentation time (EPT) corresponding to the presentation time of the first sample in a segment. This earliest presentation time is often referred to as the segment boundary and can be used to download the segment in time and play it back in time to avoid a re-buffering or a delay when presenting the content of a media segment.

Systems can detect these segment boundaries before the media segment is rendered or downloaded for playback as it is usually signaled in the manifest presentation description, playlist or index segment, both of these are downloaded before the actual media content is downloaded. Based on such timing information, download time estimation and bit-rate switching can be applied in order to select the best segment for download. In the case of distributed transcoding or encoding, different distributed components may use different presentation timestamps for frames and different earliest presentation times (EPT) for segments, and sometimes even different presentation time stamps for corresponding media frames. This results in the fact that segments generated by different transcoders are not interchangeable in media presentations such as those based on HTTP Live Streaming, smooth streaming, MPEG-DASH or Common Media Application Format, and that inter-changeable usage will introduce playback errors and glitches, as timeline discontinuities and visual discontinuities will occur when packager or encoder synchronization are not applied. The problem of distributed packager synchronization mainly refers to the generation of consistent and interchangeable media playlists on distributed entities.

This problem breaks and hinders generation of such segmented adaptive streaming content in highly available systems as required in many cases, where more than one live packager is used to generate the output tracks and media presentation descriptions. In these setups redundant encoder/packager, origin and content delivery networks are used in order to guarantee operation of the service in case one of the subcomponents in the chain fails.

In such highly available systems multiple transcoders, packagers and origins may fail and re-join again. In this case the fact that segments are not interchangeable is problematic. Therefore, the adaptive streaming transcoder and packager synchronization is a challenging and relevant problem to enable highly available and highly redundant adaptive streaming systems. Approaches have been introduced where distributed adaptive streaming transcoders are synchronized based on sharing timing information from a master encoder or transcoder with other slave encoders, these encoders use information from the master encoder to align segment boundaries, frame presentation, earliest presentation times. However, these do not offer some of the features required for highly available systems such fast re-join without exchanging information of the current stream and retransmission to add a new transcoder instance after an instance has failed. When using a master trans-coder, when this master fails or leaves a session, and this would require a scheme to assign a master transcoder and a process for slave transcoders to join a session. Therefore, in many practical cases such an approach may not meet the requirement of practical highly available setups for over-the-top streaming based on popular formats such as HTTP live streaming, MPEG-DASH, smooth streaming and the common media application format.

In over-the-top (OTT) streaming, Internet connectivity is often available, opening up other opportunities for synchronization instead of common approaches such as based on the global positioning system (GPS), such as based on the Network Time Protocol (NTP) defined by the Internet Engineering Task Force in RFC 5905. To enable encoder synchronization in OTT different approaches were presented and disclosed in the past. For dual encoder synchronization an approach was presented for encoder synchronization in the AWS live media services based on output locking (Demuxed 2019 and in Elemental live). In this case encoders have a communication path to align segment start and end times and the content trying to account for drifts and clock skews. The method shows that glitches are mitigated when switching between encoder signals, and that methods for periodical communication between encoders and discovery of joining or leaving encoders are needed. The method requires maintenance of the state of other encoders in a pool to enable the adaptive streaming transcoders to be aware of de-synchronization and communication between encoders/packagers.

SUMMARY

Techniques for distributed and redundant generation of media presentations are disclosed. Disclosures includes system and method for generation of the media presentation description using MPEG-DASH, HTTP Live streaming and other adaptive streaming presentations. The techniques are suitable for generating media presentations based on synchronized and segment aligned tracks of video, audio, timed text and subtitles, thumbnails and timed metadata or other media. The techniques target popular content formats based on MPEG-DASH, HTTP Live Streaming, Common Media Application format and the ISO Base Media File Format. The techniques are particularly suitable for distribution using two or more origin servers and or a content delivery network. Additional techniques for distribution over HTTP are disclosed.

A method for generating one or more media presentations can include identifying one or more media segments in one or more input signals, identifying one or more latest media segment presentation times in the one or more media segments, identifying one or more latest media segment presentation durations in the in the one or more media segments, adding each of the one or more latest media segment presentation times to the one or more latest media segment presentation durations in the input signal to compute one or more calculated publish times, choosing one of the one or more calculated publish times as the media presentation publish time, and generating a media presentation based on the media presentation publish time.

In some embodiments, the media presentation is an MPEG-DASH media presentation description and the media presentation publish time is set as the MPD@publishTime.

In some embodiments, the step of generating the media presentation results in a common media application format (CMAF) presentation.

In some embodiments, the step of identifying the one or more latest media segment presentation times includes adding a synchronization timestamp (STS). In some embodiments, the method further includes the step of comparing the calculated publish times of different representations to be within a configurable value.

In some embodiments, the step of generating the one or more media presentations also comprises the step of setting a Last-Modified HTTP Header that has a syntax of: <day-name>, <day> <month> <year> <hour>:<minute>:<second> GMT to a time corresponding to the media presentation publish time.

In some embodiments, the method further includes the step of applying one or more redundant encoding and packaging constraints.

In some embodiments, the method further includes encrypting the one or more media segments in the input signal using common encryption.

In some embodiments, the step of generating a media presentation results in an HTTP Live Streaming presentation. In some embodiments, the step of generating the media presentation also includes setting one or more #EXT-X-PROGRAM-DATE-TIME to the calculated publish time. In some embodiments, the step of generating the media presentation also includes wrapping the one or more media segment presentation times in a 33 bits MPEG-2 TS presentation time stamp. In some embodiments, the step of generating the media presentation also includes writing one or more #X-TIMESTAMP-MAP=MPEGTS:<MPEG-2 time>, LOCAL=YYYY-MM-DDTHH:MM:SS.mmmZ to map the MPEG-2 transport stream time to the one or more media segment presentation times. In some embodiments, the step of generating the media presentation also includes writing one or more URL's indicated under an #EXTINF tag following a naming structure that can be expressed using a SegmentTemplate@media.

In some embodiments, the step of generating the media presentation also includes writing one or more ProducerReferenceTimeBoxes to indicate when a media segment was written to disk.

In some embodiments, the step of generating the one or more media presentations also includes the step of adding an additional HTTP header with a checksum.

In some embodiments, a system for redundant media presentation generation by one or more distributed adaptive streaming packagers includes a plurality of adaptive streaming packagers having one or more processors and memory having computer instructions which when executed by the one or more processors cause the one or more processor to perform certain functions. Such functions can include identifying one or more media segments in one or more input signals, identifying one or more latest media segment presentation times in the one or more media segments, identifying one or more latest media segment presentation durations in the in the one or more media segments, adding each of the one or more latest media segment presentation times to each of the one or more latest media segment presentation durations in the input signal to compute one or more calculated publish times, choosing one of the one or more calculated publish times as the media presentation publish time, and generating a media presentation based on the media presentation publish time.

In some embodiments, the computer instructions cause the one or more processors to perform the function of setting a Last-Modified HTTP Header that has a syntax of: <day-name>, <day> <month> <year> <hour>:<minute>:<second> GMT to a time corresponding to the media presentation publish time.

In some embodiments, the one or more distributed adaptive streaming packagers are deployed on geographically distributed locations.

In some embodiments, the system forms a part of a cloud-based services system.

In some embodiments, the receiver comprises a streaming origin server that combines packager and origin functions and further includes a content delivery network coupled to a digital rights management system.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 9 illustrates the steps involved for distributed media presentation generation where the generated output includes an MPEG-DASH manifest;

FIG. 10 illustrates the example of an HTTP live streaming media playlist generated by preferred embodiments of the disclosed invention as a synchronized output track;

DETAILED DESCRIPTION

Figure 5:
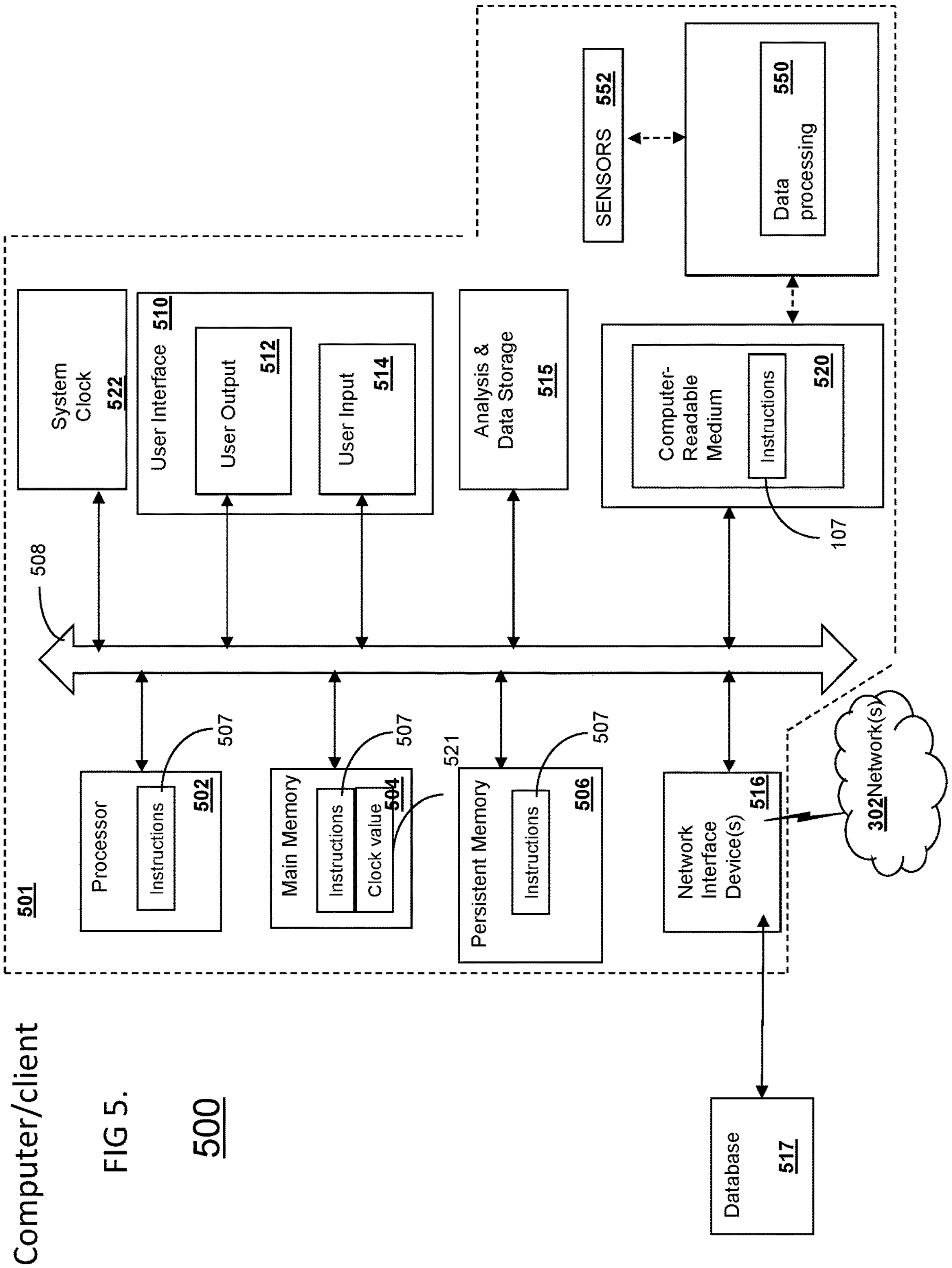
FIG. 5 illustrates an example computational architecture for implementing the method disclosed in accordance with the embodiments.

Disclosed herein are techniques for generating redundant media streaming presentations on physically distributed entities. This includes techniques to generate the output media presentation description and media playlist. In addition, techniques herein disclose how to mark HTTP responses with timing information to enable interchangeable media presentation descriptions and segments. Some embodiments teach how a plurality of redundant packagers can be used to generate interchangeable (live) media streaming presentations. Embodiments use preferred media presentation formats based on MPEG-DASH defined in ISO/IEC 23009-1 and/or Common media application format (CMAF) defined in ISO/IEC 23000-19. Further disclosed are techniques to implement the method in hardware or software and computational architectures as illustrated in FIG. 5.

Adaptive Streaming uses HTTP or HTTP over Transport Layer Security (TLS) as the primary transport protocol. This enables re-using the existing Internet infrastructures for adaptive streaming media content delivery. To achieve the quality and scale matching that of linear broadcast, distribution chains need to be designed with fault tolerance and redundancy in mind. This frequently requires running multiple redundant adaptive streaming packagers in parallel. Adaptive streaming packagers take an input signal, usually from one or more distribution encoders, and segment it into individually accessible media segments and generate a media playlist or media presentation description detailing all available segments that a player or client can request for download.

Distribution encoders, also herein referred to as adaptive streaming encoders, are responsible for transcoding the content to different bit-rates and qualities. Their output may be used as input to one or more distributed packagers, and may be formatted as segmented ISO BMFF tracks as defined in 14496-12 or ISO/IEC 23000-19 CMAF or using another format such as MPEG-2 transport stream defined in ISO/IEC 13818-1.

The next step, referred to as adaptive streaming packaging may include (re-) generating one or more ISO-BMFF compliant tracks composed of one or more media segments, and related media playlists in a text format, such as MPEG-DASH media presentation description or HTTP Live Streaming media playlists. In some cases, the term adaptive streaming packager may be used to refer to a component that implements both functionalities of transcoding and packaging to a streaming output format, but usually in a distributed architecture the live packager and transcoder are separated. In practice, such components are often deployed to enable a direct conversion of an input to one or more adaptive streaming formats. Adaptive streaming packagers may also perform functionalities such as content encryption/protection.

Adaptive streaming packagers can be implemented in various ways using dedicated hardware or graphics processor units (GPU's) or using common general-purpose hardware and information processing systems as shown in FIG. 5 and software. In preferred embodiments, the implementation is based on Unified Origin Software as developed by CodeShop B.V. and licensed by Unified Streaming B.V. Unified Origin is a web module for Apache server that enable just in time packaging functionality, allowing an Apache webserver to generate media presentation description or playlist on-the-fly. Other implementations of similar functionality have been implemented in MediaPackage by AWS Elemental, broadpeak bsk, or Wowza media server developed by Wowza media systems or other open source or commercial packaging software such as Bento or MP4Box (GPAC) developed as both open source and in proprietary manners. The disclosure applies to different implementations of just-in-time packagers or other entities generating media streaming presentations that are commonly used for live stream media presentation generation, and as described herein is independent of the specific adaptive streaming packager implementation.

In the case that a plurality adaptive streaming packagers are running in parallel, the plurality of adaptive streaming packagers should produce media playlist or media presentation descriptions that reference common/identical media segments available for download. This allows players to use media presentations from the plurality of adaptive streaming packagers interchange-ably without introducing errors. Therefore, a key problem when operating distributed packagers is to generate consistent and interchangeable manifests for players and other downstream entities such as content delivery networks and/or origin servers. This problem is referred as redundant media presentation generation.

The key difficulty is that different packagers may receive input at different times, or some input may have been lost and corrupted, resulting in inconsistent media streaming presentations. Common players for adaptive streaming playback apply playlist updates, after an update the player expects a functionally equivalent media presentation, that is new segments or media maybe added, but no retro-active changes should apply to key configuration fields such as @availabilityStartTime, @timeShiftBufferDepth, Period@start, Period@id etc or related fields in HTTP Live streaming or smooth streaming fields. In the case of a media presentation description conforming to ISO/IEC 23009-1, in addition, segments announced at the live edge shall be included in any update.

The requirements and problems related to distributed packager synchronization have been described by the MPEG standardization organization WG 3 that is part of ISO/IEC JTC1 SC29. The industry requirements for packager synchronization have been developed as this problem is of great relevance to the industry and supporting documents with requirements and use cases for packager synchronization that have been published by the MPEG standardization organization (ISO/IEC JTC1 SC29). Techniques and methods to solve this problem beyond the state of the art are solicited by the MPEG organization indicating the importance to the industry. The disclosed techniques specifically address this problem outlined as important to the industry for redundant media delivery and packaging.

Redundant packagers often receive input from one or more distribution encoders that produce one or more output media tracks, and often inter-encoder synchronization is applied that encoders produce time aligned and frame aligned output. Techniques for achieving inter-encoder synchronization are not part of this disclosure, but prior disclosures have been made on this topic (e.g. Mekuria et al.).

It is assumed that a setup includes more than one distribution encoder producing identical and aligned segments (i.e. encoder synchronization), such that redundant packager setups as disclosed in this document can be realized, as it is possible to use the output from the different encoders interchangeably by distributed adaptive streaming packagers. Different methods for synchronization of output of distribution encoders exist.

The problem, sometimes referred to as packager synchronization considers producing the interchangeable streaming manifests or playlists from different distributed sources, such as adaptive streaming packagers. In practical systems, encoders, packagers and origins are separate entities in a distributed workflow. This facilitates the scale and fault tolerance required by such setups but makes it a challenge to produce manifests that can be used interchangeably by different players due to timing differences between redundant distributed entities. For example, a timeline must not be changed retro-actively as this could confuse players. In addition, segment availability should be consistent across manifests in order to avoid erroneous requests and playback.

Also, a discontinuity introduced in one manifest or media playlist must also be present in another version of the manifest generated by a different packager node to be consistent. These restrictions might be slightly different depending on the content or protocol format that is used. An important way to avoid this as disclosed is to cross transmit from two or more distribution encoders to two or more adaptive streaming packagers. In particular, in preferred embodiments, two or more distribution encoders cross post to two or more adaptive streaming packagers. In preferred embodiments of this disclosure, the times at which different distribution encoders transmit their content is within configurable bounds, to make sure different distributed adaptive streaming packagers generate consistent output based on consistent input.

Some existing solutions sometimes support inter-encoder and packager synchronization, but these may not match common requirements from broadcaster or content operators. For example, often, it requires a communication channel between the entities which may not scale well in practical distributed and stateless head-ends with high availability. The embodiments herein disclose an approach that does not require such communication means. The disclosed approach of redundant packager operation is both broadly applicable and scalable as it does not require additional communication means between distributed packagers.

To understand better the aspects of interoperability in the OTT Head-end, we introduce the reference architecture of streaming head-ends developed in the DASH Industry Forum to illustrate the typical components in a testbed. The DASH-Industry forum is an organization committed to accelerate the adoption of MPEG-DASH, but some of its work is generally applicable to HTTP Streaming solutions and Head-Ends. Initial work focused on implementation guidelines using DASH with related codecs and use cases resulting in the most recent version of the DASH-IF Interoperability Guidelines 4.3. In recent years, the DASH Industry forum has done more work on the interoperability aspects in the OTT Head-end and developed a reference architecture, a simplified view of which is shown in system 100 of FIG. 1, the packager and origin functions are combined in this schematic, where these can also be separated. The architecture includes components such as the ABR encoder also referred herein as the adaptive streaming transcoder or distribution encoder 102 that is the entry point to an adaptive streaming head-end 101, the streaming origin server 104 that combines adaptive streaming packager 106 and/or origin functions, (this could also be split up in two different entities), the content delivery network (CDN) 109 and Digital Rights Management (DRM) systems (105) that are present in most Over-the-top (OTT) head-ends and defines the commonly used interfaces. Most services that generate adaptive streaming content, especially for live channels, will include one or more adaptive streaming transcoders (distribution encoders) and one or more adaptive streaming packagers 106 and one or more content delivery networks. The DASH-IF reference model does not disclose, how one or more adaptive streaming packagers can be deployed in parallel or how they can be deployed jointly in a redundant manner in a streaming workflow.

Figure 1:
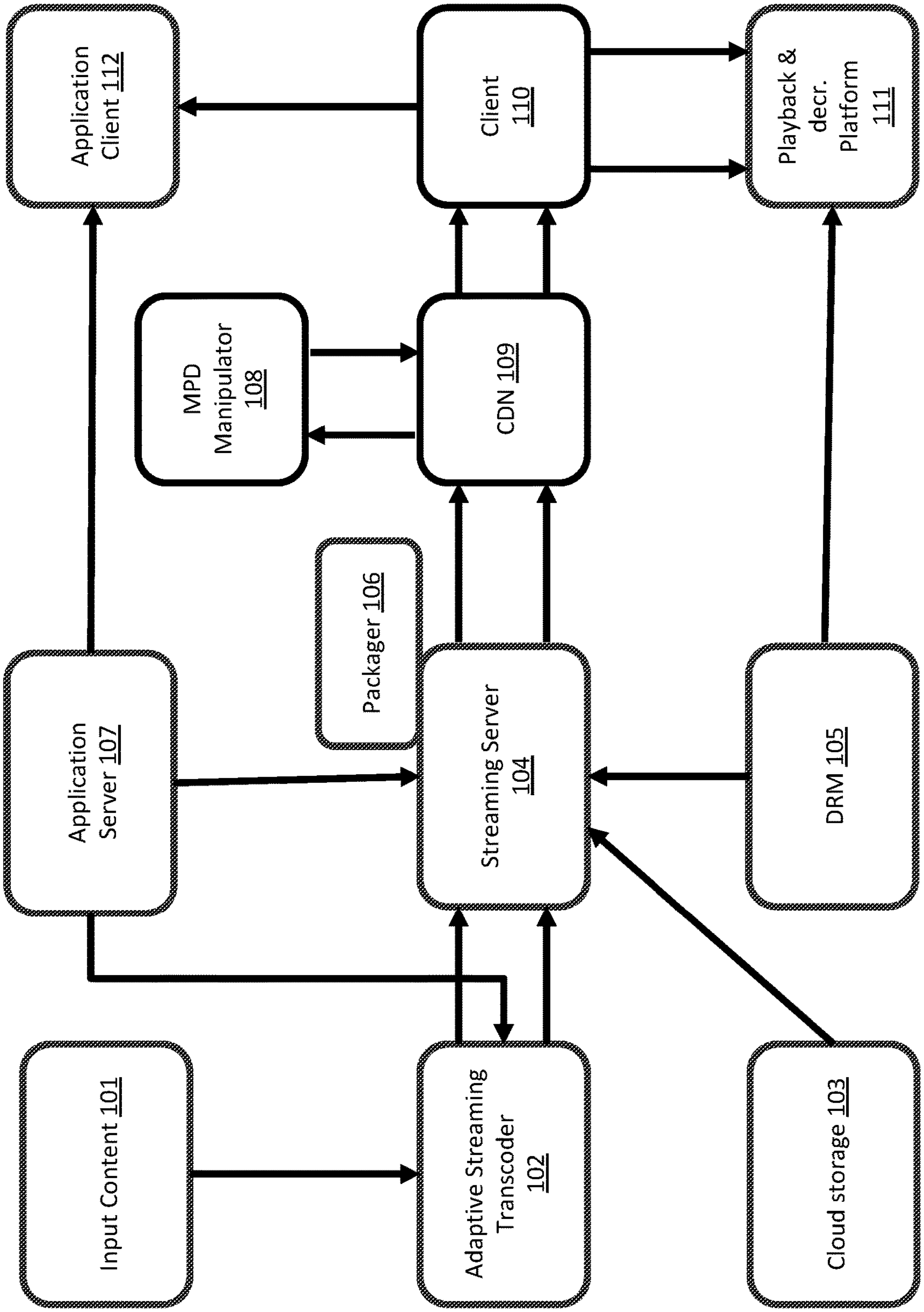
FIG. 1 illustrates an example computational architecture for implementing a client device for receiving and requesting adaptive streaming segments, or resources used to deploy adaptive streaming packaging and encoding systems in accordance with the embodiments.

In addition, the model of an adaptive streaming client 110 using reference playback 111 is included in the system 100 of FIG. 1, where the reference playback platform 111 is used to playback the actual media segments downloaded by the adaptive streaming clients. Example implementations of such reference playback platform include MSE/EME platforms developed by W3C and available in browsers and in some television devices. The OTT (Over-the-Top) Head-end is typically started by input of content or signals to one or more distribution encoders or adaptive streaming transcoders, where such inputs may be based on some common contribution or broadcast formats. For interfacing between the adaptive streaming transcoder to the streaming origin server, the DASH-IF defined the live media ingest protocol which uses HTTP POST or PUT method to transmit media objects. To exchange key information server side, the DASH-IF developed content protection interchange (CPIX), an XML based format is used in API's that are commonly supported by different DRM vendors. In some workflows, instead of using adaptive streaming transcoders, stored content, may be used as input to the OTT Headend, in this case the use cases may apply to using multiple storage backends interchangeably. The method disclosed here teaches how multiple adaptive streaming packagers can be configured to deliver interchangeable playlists. The method teaches how to produce interchangeable manifests or media playlists.

Information processing systems such as illustrated in FIG. 5 include an explicit communication between distributed adaptive streaming packagers, via the Network 302. While the network 302 is available, a protocol for exchanging encoder synchronization information is non-trivial, hence the technique disclosed here does not require the network 302 to be used for information exchange between the distributed adaptive streaming packagers. A system or method that does not require communications between adaptive streaming packagers is preferable as it is easier to deploy it in practice as it can be used easily in case of failing and leaving adaptive streaming and newly (re-)joining packagers. Preferred embodiments of the embodiments teach one or more distribution encoders cross transmitting to one or more adaptive streaming packagers.

The method and system in the embodiments herein disclose how to support failing and leaving/joining adaptive streaming packagers and the distributed generation of media streaming presentations in popular streaming formats. Specifically, the method of FIG. 8 details how to operate in case of a device failure.

The generation of content conforming to different media streaming standards need to be supported by adaptive streaming packagers, standards such as the MPEG ISO Base Media File Format ISO/IEC 14496-12, MPEG-DASH ISO/IEC 23009-1, the Common Media Application Format (CMAF) defined in ISO/IEC 23000-19 and HTTP live streaming as defined by IETF in RFC 8216 are key to support. Other proprietary streaming formats such as Microsoft Smooth Streaming or other formats are may also be supported.

Figure 11:
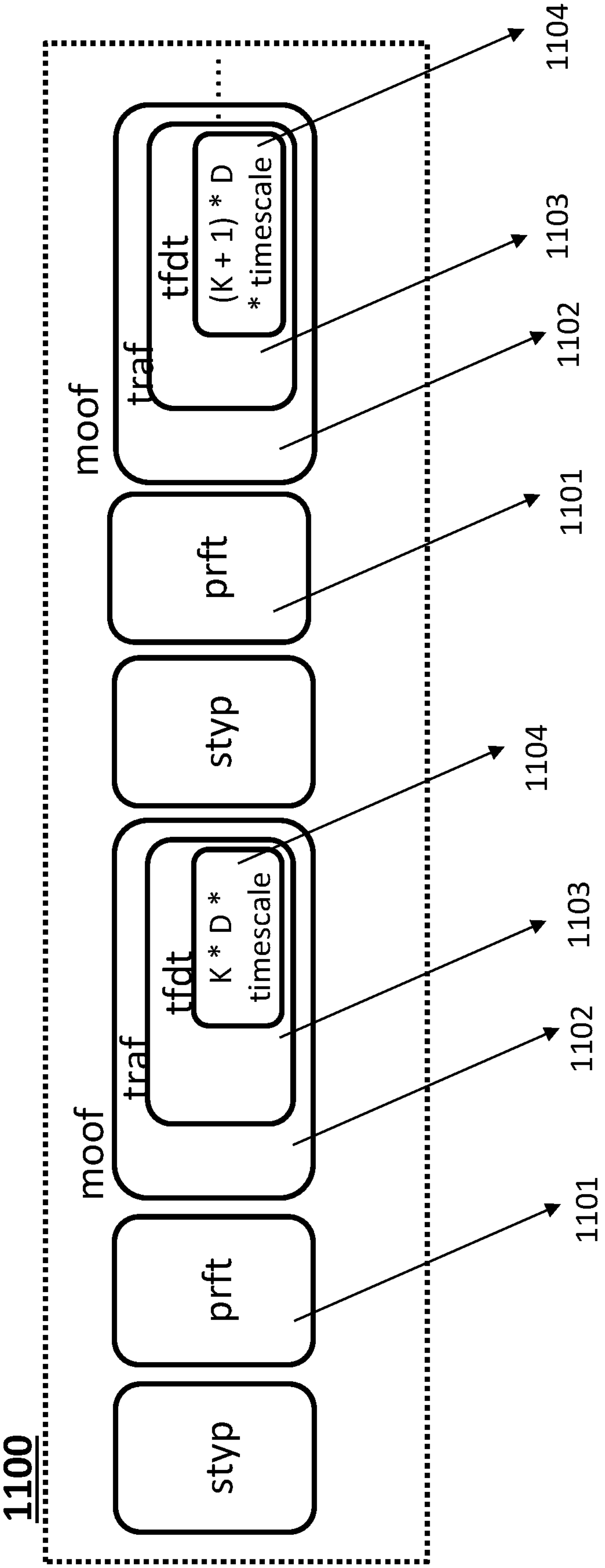
FIG. 11 illustrates the example of a Common Media Application Format track generated in preferred embodiments of the redundant media presentation generation.

Adaptive streaming packager output is shown in FIG. 9, FIG. 10, and FIG. 11 illustrating examples using the MPEG-DASH format, the HTTP Live Streaming format and the Common Media application format (CMAF) example. Examples using other formats such as smooth streaming or MPEG media transport could use similar formats. The support for common formats is expected to enable broader and quicker adoption.

Algorithms for enabling redundant media presentation generation without explicit timing information can also be used with the system and methods disclosed in the embodiments herein by using techniques for alignment of media streaming content. In case input signal or content inserted to different distributed streaming packagers do contain shared timestamps and aligned media samples, or explicit metadata to align streams, such information is included with the input stream.

Naïve redundant media presentation generation would still require a master streaming packager to be chosen which is the streaming packager that other packagers need to align with and use as a reference. The disclosed embodiments also enable synchronized and redundant generation of media presentations comprising timed metadata representations, timed text representations and audio or video representations.

For redundant media playlist generation, additional requirements exist as in this case the manifests or playlist also needs to full-fill certain requirements to enable consistent playback by players requesting these manifests or playlists. These include generating consistent manifests or playlists without retro-active changes to the timeline that can be played consistently and interchangeably. The key disclosed technique is to set the MPD@publishTime for MPEG-DASH to the latest media segment plus its duration plus @availabilityStartTime or set the EXT-X-PROGRAM-DATE-TIME to the time of the media presentation by converting it back to a real wall clock time in the same manner. This results for MPEG-DASH in a media presentation description output with MPD@publishTime equal to the MPD@availabilityStartTime plus the media presentation time plus segment duration of the newest segment divided by the timescale. The MPD@publishTime is directly derived and related to the MPD@publishTime and MPD@availabilityStartTime. For HTTP Live Streaming the EXT-X-PROGRAM-DATE-TIME is set the corresponding segment time plus its duration in a similar manner, that is setting the #EXT-X-PROGRAM-DATE-TIME to a <date-time-msec>, in this case the date-time-msec is the media presentation time of the earliest segment, but the duration need not be added, thus the #EXT-X-PROGRAM-DATE-TIME can be set. The key innovative step is to include the media time here instead of the actual wall clock time from the system that may introduce race conditions.

The methods support different framerates including non-integer frame rates. Also, the redundant approach should not require features uncommonly present on clients that support at least MPEG-DASH and HTTP Live Streaming protocols, i.e. the disclosed system and method do not require any new features on DASH and HTTP live streaming clients, except calculating back the time which is a default feature on DASH and HTTP live streaming players. With the disclosed embodiments it is also possible to generate an interoperable redundant streaming manifest based on MPEG-DASH or a media playlist based on HTTP Live Streaming on a distributed entity.

Figure 2:
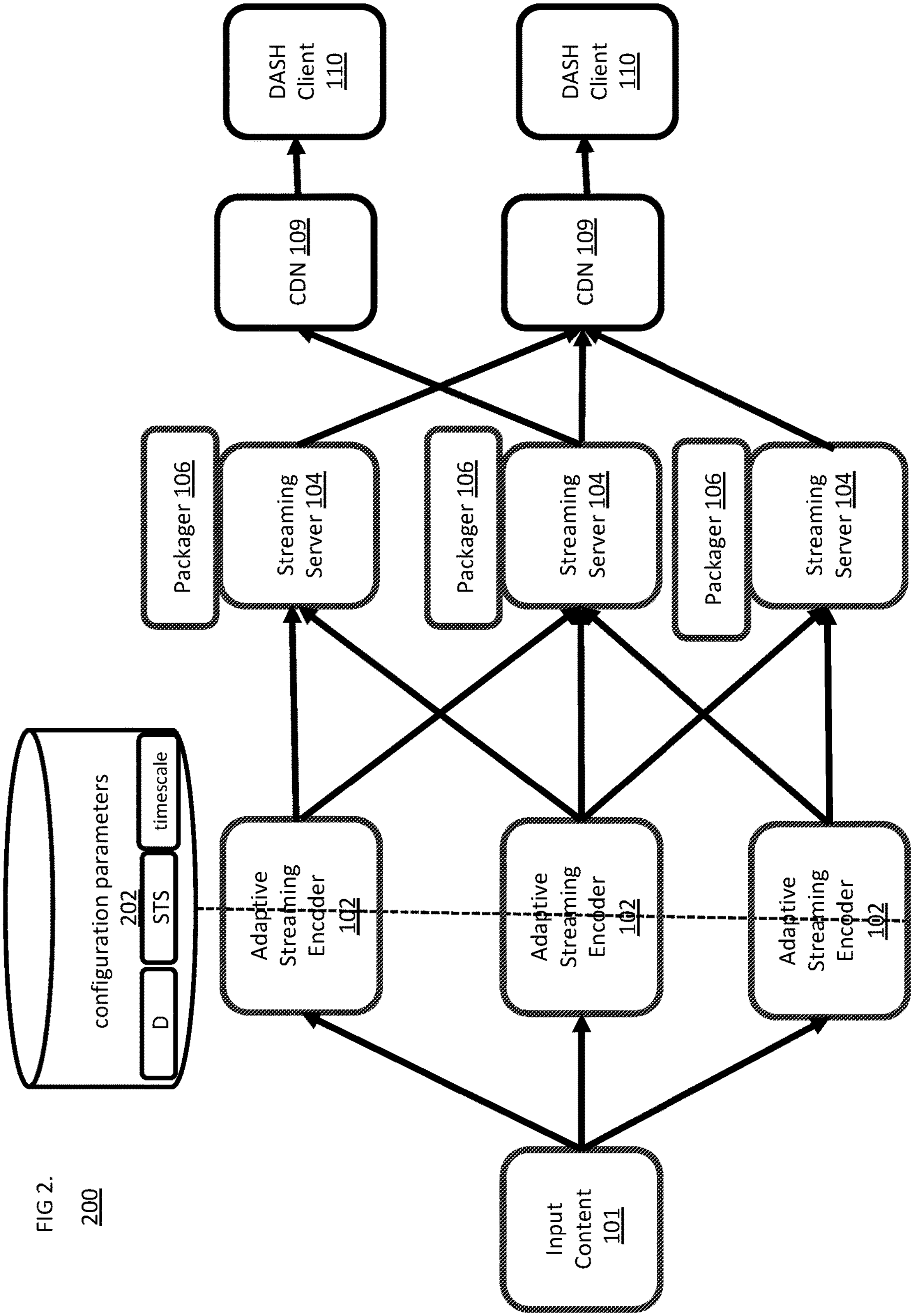
FIG. 2 illustrates an example computational architecture to deploy a plurality of redundant Adaptive Streaming Encoders, packagers and origins in relation with the embodiments.

FIG. 2 shows the schematic architecture 200 that could be used in case of an implementation of the disclosed embodiments. Multiple adaptive streaming encoders 102 are transmitting their output tracks to one or more distributed origin/packager servers (104 and 106). The distributed adaptive streaming transcoders are expected to use a common input signal 101 or an input with common per frame timing information. If this is not the case, a synchronization timestamp (STS) may be configured that maps the input timestamps to output timestamps. In some cases, and some embodiments, an alternative way to carry information relating the synchronization time stamp may be conveyed in different ways as an encoder/transcoder configuration. For example, it could be embedded in the input bitstreams or as SEI (supplemental enhancement information), in SCTE 35 or SCTE 104 markers etc. To the extent of implementing the disclosed embodiments, such alternate ways of disclosing information relating to the synchronization timestamp that is used to compute the relative timing offset from a UTC timeline origin based on a common reference, are not precluded.

Thus, the difference between the time anchor and relative timing and the timing in the source signal is provided in this STS value or conveyed in an alternative way. If no such information is available, as mentioned before, an alternative method would be needed to synchronize the stream inputs first, i.e. a stream synchronization method. Also, the timescales for different media types should be configurable to allow frame accuracy and avoid rounding errors when a mismatch with the input timescale occurs.

This helps to keep some of the requirements on DASH segment durations such as when using @duration and number based addressing schemes when using SegmentTemplate element in a DASH manifest. In case non-integer frames are used, audio segment durations may vary to align to video segment durations. Redundant media presentation generation use well defined constraint formats for Redundant media presentation packaging based on MPEG DASH ISO/IEC 23009-1 or common media application format ISO/IEC 23000-19, And such deviations may occur.

This disclosure discloses additional media format constraints for input and output to redundant packagers. By receiving input format according to the input format constraints the plurality of adaptive streaming packagers can generate interchangeable media presentation descriptions or media playlists.

The Adaptive streaming packager is responsible for converting the input to a valid delivery MPD (D-MPD), a media presentation description as defined in ISO/IEC 23009-1 for playback by a client or a media playlist based on RFC 8216. In such a workflow, two or more distribution encoders transmit to two (or more) packagers. This redundancy makes it possible to use segments from different distribution encoders interchangeably.

This disclosure discloses preferred output formats to enable synchronized and interchangeable generation of media playlists from distributed packagers. We call these the redundant and distributed packaging constraints. In the method of redundant media presentation generation, the following redundant encoding end packaging constraints apply to the output media segments.

a) Media segments should be of a constant segment duration D, where the duration is the sum of all media sample presentation durations as indicated in the TrackFragmentRunBox.
b) In case of splicing, when a segment is created with duration A instead, the next media segment shall be of duration $2\times D-A$ to keep the numbering and the number of segments since epoch. Alternatively, splicing can be achieved by inserting an IDR within the media segment and not creating a segment boundary. In this case the segment duration is D.
c) The SegmentType box may contain a 'slat' brand in case the segment was missing frames. In case the SegmentTypeBox contains a 'slat' brand.
d) In case the segment is the last segment, the SegmentTypeBox should contain the 'lmsg' brand. If the SegmentTypeBox contains the 'lmsg' brand it is the last segment in the track.
e) The MovieFragmentHeaderBox shall contain the segment sequence number (K).
f) The TrackFragmentDecodeTime box should contain a baseMediaDecodeTime that is equal to K×D×track_timescale. Only in case of varying segment duration there may a deviation.
g) An edit list box shall not be used (when using epoch relative media presentation timing).
h) The 'roll' sample group may be used to indicate requirements for audio playout based pre-roll samples.

NOTE: Inserted/replaced periods that use period relative media presentation times (as opposed to epoch relative media presentation timing, may have an edit list inserted to meet requirements of the audio playout process.

A step of generating a media streaming presentation should include the step of applying these constraints on output media segments in a media streaming presentation. These requirements apply to media segment output.

Samples that overlap a leap second, may be adjusted to account for the leap second (reducing the duration of samples). Otherwise, media frames occurring during the leap second may be discarded by the encoder and not included in the track. Inserted/replaced periods that use period relative media presentation times (as opposed to epoch relative media presentation timing), may have an edit list inserted to meet requirements of the audio playout process, and also may not comply with segment formats. Redundant distributed packagers shall, upon an HTTP request or response containing a media playlist or D-MPD in the body, set the Last-Modified HTTP Header: that has a syntax of: <day-name>, <day> <month> <year> <hour>:<minute>:<second> GMT to a time corresponding to the earliest presentation plus segment duration of the newest segment. This avoids some of the race conditions of MPD's generated by different redundant packagers. To enable debugging, the packagers should write ProducerReferenceTimeBoxes to indicate when a media segment was written to disk. This may result in more than one ProducerReferenceTimeBox per segment if a segment that is expected to be available or received is not yet available to a redundant distributed packager, it may return an error response or an earlier version of the streaming media presentation.

Additional requirements on media formats used as inputs to redundant packagers are the following: distribution encoders cross-transmit segments to the different available redundant packagers in the workflow. Each distribution encoder 1 . . . N transmits all output media segments to all packagers 1 . . . M. Interchangeable segments of each Representation should have identical earliest media presentation time K×D×track_timescale, except in cases when the segment duration is varying due to an ad break. In some practical cases cross transmission may be costly, optimizations in the transmission protocol can be applied such as using optimized request response schemes that can be used to avoid redundant data transmission between distributed encoders and packagers.

Distribution encoders shall transmit segments at roughly the same time configurable within bounds using a configurable fixed encoder delay Dc. Therefore, a segment with earliest presentation T shall be transmitted at T+segment_duration+Dc by each of the encoders within a configurable bound (e.g. 500 ms). Therefore, redundant packagers should receive interchangeable input media segments within time limited bounded time differences.

In practical systems this requires wall clock synchronization of encoders, that would usually be within 100 milliseconds bounds (+−100 ms) in practical systems using NTP servers or other synchronization methods.

Each distribution encoder transmitting segments to a redundant distributed packager may write a ProducerReferenceTimeBox for each segment, that Producer ReferenceTimeBox shall contain the time a segment entered the encoder (flags field set to 0) and the time it was encoded (flags field set to 1). Distribution encoders should write ProducerReferenceTimeBoxes reflecting the time a segment was entering the encoder (flags field set to 0) and shall write the time it was encoded (flags field set to 1) in a ProducerReferenceTimeBox to a segment. This may result in segments with multiple ProducerReferenceTimeBoxes as input to the redundant packager Splicing information and metadata shall be available at each of the packagers at least 8 seconds prior to required use. Timed metadata shall be available to the packager during its active period. This implies that, when timed metadata is carried in DASHEventMessageBox(es). These boxes shall be repeated in segments as long as they are active. Otherwise, a separate segmented timed metadata track for carriage of event message metadata is used such as based on ISO/IEC 14496 clause 12.3 or ISO/IEC 23001-18. Each segment then contains all metadata events that overlap the media presentation internal of the segment. Each sample then contains all metadata events that overlap the media presentation internal of that sample.

Specific additional requirements on redundant packager output media playlists format are also defined, which it the case of a redundant packager generating a media presentation according to ISO/IEC 23009-1.

The media presentation description MPD should be generated according to the mapping described in the CMAF profile for DASH ISO/IEC 23009-1 clause 8.12. Further constraints on generation of the D-MPD may be implementation dependent and application specific.

The media presentation description, when returned by adaptive streaming packagers, shall set the MPD@publishTime to the time corresponding to the earliest presentation time plus segment duration of the latest (largest presentation time) segment. The redundant packager sets the MPD@publishTime to date/time that correspond to the media presentation time of the earliest presentation time plus segment duration of the newest segment, plus the anchor e.g. 1-1-1970 00:00 excluding leap seconds. The calculation of the MPD@publishTime performed by adding the anchor (00:00:00 1-1-1970 defined by MPD@availablityStartTime to the Period@start and the presentation time of the newest segment plus its duration, adjusted by its timescale, and converted back to the type="xs:dateTime". The xs:dateTime field follows the following structure: PnYnMnDnTnHnMnS where, P The duration designator, nY is the number of years were n is an unsigned integer that represents the number of years. nM where n is an unsigned integer that represents the number of months. nD where n is an unsigned integer that represents the number of days. T which is The date and time separator nH n is an unsigned integer that represents the number of hours nM where n is an unsigned integer that represents the number of minutes. nS where n is an unsigned decimal that represents the number of seconds. If a decimal point appears, it must be followed by one to twelve digits that represent fractional seconds. For example, the following form indicates a duration of 1 year, 2 months, 3 days, 10 hours, and 30 minutes: P1Y2M3DT10H30M0S So, for example a media presentation with @availabilityStartTime of 00:00 1-1-1970 and a Period@start PT100S and a presentation time scale of 10 and media presentation time plus segment duration of newest segment 1000/10 seconds, the MPD@publishTime would be P0Y0M0DT0H3M20S which correspond to 200 seconds after unix epoch (1-1 1970). If a segment that is supposed to be available or received by the redundant packager and published in the MPD but it is not yet available at the packager, the packager shall return an error response when an MPD is requested. Such error response may use an error response code 4xx.

Redundant adaptive streaming packagers. i.e. media presentation generators shall write the D-MPD with aligned representations. The segments in each representation and the durations of representations shall be aligned (within 100 milli seconds bounds). The only exception to this is at the beginning or end of a live stream presentation. This implies that an MPD is only updated modified when updated segments for each representation are available to the packager. Each redundantly generated media presentation shall have aligned media representations. Further, Redundant packagers using a shared storage is one way of enabling such consistent manifest generation between redundant packagers. Therefore, in preferred embodiments of adaptive streaming media presentation based on ISO/IEC 23009-1 representation latest segment plus its duration do not differ more than 100 milliseconds. In preferred embodiments of adaptive streaming media presentation based on RFC 8216 HTTP live streaming each media playlists latest segment plus its duration do not differ more than 100 milliseconds.

Specific requirements on redundant packager media presentation HLS (HTTP Live Streaming) output format apply for the for generation of media playlist based on RFC 8216 as defined in IETF. The segment URL's indicated under an #EXTINF tag shall follow a naming structure that can be expressed using a SegmentTemplate@media string using $Number$ or $Time$, allowing common segments in RFC 8216 media playlist with D-MPD playlist.

Playlist shall include one or more #EXT-X-PROGRAM-DATE-TIME tags to link the wall clock time to the media segment time. Media presentation timestamps of the live media segments shall be relative to Unix epoch and segment duration shall be near constant, or durations shall be compensated between subsequent segments. In case the segment format is based on transport stream i.e. MPEG-2 TS, the presentation time stamps shall correspond to the media presentation time stamps from the media segments received from the encoder, but wrapped in 33 bits and using a 90 Khz scale.

In case MPEG-2 Transport stream is used, the #X-TIME-STAMP-MAP=MPEGTS:<MPEG-2 time>, LOCAL=YYYY-MM-DDTHH:MM:SS.mmmZ shall be used to map the MPEG-2 transport stream presentation timestamps to the corresponding local time, however in this case the local time set is derived from the original time since epoch, thus the media presentation time of the segment in case it was not wrapped in a 33 bit integer but instead carried as for example a 64 bit integer.

When multiple media playlists are published by a generator, media segments shall be aligned between media playlists within at least 100 milli seconds, that is the earliest presentation time plus duration of newest segment in different playlist shall not differ more than 100 milli-seconds.

A common way to define the URI to transmit the segment to is by deriving the SegmentTemplate element and its @media and @initialization attributes from the MPEG-DASH manifest, or based on reading URI from the Media Playlist. The derivation of the segment URL is then done as defined in the MPEG-DASH specification, ISO/IEC 23009-1 combining the replacing the template fields $RepresentationID$ strings and the $Time$ or $Number$ strings with the actual values derived for the template fields from Representatino@id for $RepresentationID$ and the media presentation time for $Time$. For HTTP Live streaming playlist, filenames can be read directly from the media playlist.

Redundant streaming packagers can be implemented based on a webserver such as Nginx, Varnish Apache etc, in preferred embodiments it is based on the Unified Origin as developed by the Unified Streaming company and Code-Shop B.V. Alternative implementations may be based on similar technologies and implementations of live media packagers such as using AWS elemental mediapackage or wowza media server or other packagers such as based on bento or mp4 box or gpac as developed as open source projects. Alternatively other packagers as available from commercial and non-commercial distributions.

FIG. 1 illustrates a common reference setup or architecture 100 used in over-the-top streaming head ends used by a broadcaster or operator, and within this setup several of the techniques disclosed in the embodiments may apply, in different forms not necessarily fixed to the preferred embodiments. In many setups the entry point to the over-the-top streaming workflow is the Adaptive Streaming transcoder 102 that can be an adaptive bit-rate transcoder such as for example developed by different companies in hardware or software. Adaptive streaming transcoders 102 take input content 101 and transcode it to different visual qualities and bit-rate renditions. The results are output tracks that are then transmitted to the streaming server 104, that may be composed of a packager 106 to package content in the right format for content distribution and serve the content to clients 110 via content delivery networks 109 or other entities. The input content 101 can be in any of the common contribution formats or legacy broadcast formats. Examples include RTP/SDP based ingest suing SMPTE 2110 over internet protocol, or using MPEG-2 Transport stream formats based on commonly used ATSC, DVB or other television standards or other standards that adopted MPEG-2 Transport streams for broadcast. Other common formats for distribution include Zixi and Secure real-time transport SRT based protocols for ingesting the input content to the adaptive streaming transcoder. The adaptive streaming encoder 102 prepares the content in different qualities and different bit-rates and in preferred embodiments encodes the content to Common Media Application Format or ISO Base Media File format tracks using MovieFragments. In an output based on Common Media Application format or ISO Base Media File format using movie fragments, content is segmented in smaller individually addressable and playable pieces. In preferred embodiments, each of these pieces, referred to as media segments use the same constant duration D. The adaptive streaming transcoder 102 transmits the segments and/or tracks to the streaming origin server 104, typically using HTTP POST or other push-based method e.g. HTTP PUT, in preferred methods the transmission is based on the DASH-IF live media ingest protocol format that allows the transmission of common media application format segments of HTTP using POST or PUT Method, and an optional manifest to indicate the grouping of tracks for the receiver. The streaming server 104 has a packager component (106) to re-package and encrypt streams for consistent delivery to clients (110), examples of encryption modes and DRM's include common encryption based on MPEG-B as defined in ISO/IEC23001-7 or AES encryption of segments. In many cases a commercial DRM is used that enables associated license acquisition such as Apple Fairplay, Google Widevine or Microsoft Playready DRM's. Preferred embodiments of the streaming server are based on Unified Origin as developed by CodeShop and Unified Streaming, but other similar implementations by other vendors such as Wowza systems, Ateme, Broadpeak, Harmonic, MediaKind, AWS MediaPackage or other origin servers with packaging capabilities may be used. The Content delivery network (109) is responsible for distribution and intermediate caching of encoded and packaged media segments. This includes storing segments at edge servers and forwarding them to clients. A content delivery network 109 may use servers for caching such as based on Nginx, Varnish, Apache webserver or other webservers and can also be based on commercially available full implementations such as using AWS CloudFront, Akamai, limelight, CDN Networks or other commercial offerings of CDN 109. The segments are forwarded and transmitted to streaming clients 110 which may use a playback platform 111 that usually includes a content decryption module for decrypting and playing back the content. The clients and servers may use application server/client (112 and 107) to add application logic to enable customized features such as session-based streaming or personalization. The MPD manipulator 108 is an edge-based component that may change segment references or update manifest/playlist in order to customized content that users receive. The goal of the MPD manipulator 108 is to prepare the content for ad insertion and other use cases such as customized playlists etc without changing underlying segments. Common implementations that do dynamic ad insertion based on an MPD manipulator include Google dynamic ad services and Yospace dynamic ad services, google DAI or doubleclick, but any service or implementation could be used to achieve server-side ad insertion as also documented by the DASH-Industry forum version 5. In some cases, instead of the output of an adaptive streaming transcoder, a stored content is used as input to a workflow, or streaming setup from a cloud storage 103. Typical examples of cloud storage include AWS s3, Google storage cloud and Azure storage cloud and OpenStack swift. By using stored input to the streaming head-end use cases related to VoD-to-Live, catchup TV and other more tailored services can be developed. In this case the streaming origin server is responsible for converting the input content to the right format to be played out in an altered form.

FIG. 2 illustrates the configuration of a setup to realize preferred embodiments of the disclosed embodiments following the reference architecture from FIG. 1. To realize a redundant infrastructure 200 with more than one adaptive streaming transcoders 102 and multiple streaming server origins/packagers (104 and 106 respectively) and one or more content delivery networks (109) are coupled communicatively. The coupling is done through a network 302 (shown in FIG. 3) having connections using a protocol for exchanging segment media data. In preferred embodiments the two or more distributed packagers may generate media presentations complying to the following constraints: media presentation generators shall write aligned DASH representations or aligned HLS playlists. The segments in each representation and the durations of representations are aligned within bounds, for example 100 milli second bounds. The only exception to this is at the beginning or end of a live stream presentation. This implies that media presentations are only modified when updated segments for each representation are available to the packager, as otherwise different representations would not be aligned. Further, Redundant packagers may in preferred embodiments be using a shared storage to achieve this in practice. In preferred embodiments of adaptive streaming media presentation based on RFC 8216 HTTP live streaming each media playlists latest segment plus its duration do not differ more than 100 milliseconds.

Specific requirements on redundant packager media presentation HLS (HTTP Live Streaming) output format apply for the for generation of media playlist based on RFC 8216 as defined in IETF. The segment URL's indicated under an #EXTINF tag shall follow a naming structure that can be expressed using a SegmentTemplate@media string using $Number$ or $Time$ following conventions as described in ISO/IEC 23009-1.

HTTP Live Streaming Playlist shall include one or more #EXT-X-PROGRAM-DATE-TIME tags to link the wall clock time to the media segment time. Media presentation timestamps of the live media segments shall be relative to Unix epoch and segment duration shall be near constant, or durations shall be compensated between subsequent segments. In case the segment format is based on transport stream i.e. MPEG-2 TS, the presentation time stamps shall correspond to the media presentation time stamps from the media segments received from the encoder, but wrapped in 33 bits and using a 90 Khz scale. In case MPEG-2 Transport stream is used in HTTP live streaming segments, the #X-TIMESTAMP-MAP=MPEGTS:<MPEG-2 time>, LOCAL=YYYY-MM-DDTHH:MM:SS.mmmZ shall be used to map the MPEG-2 transport stream presentation timestamps to the corresponding local time for one or more segments. When multiple media playlists or representations are published by a generator, media segments are aligned between media playlists within at least 100 milli seconds, that is the earliest presentation time plus duration of newest segment in different playlist shall not differ more than 100 milli-seconds. A common way to define the URI to transmit the segment to is by deriving the SegmentTemplate element and its @media and @initialization attributes from the MPEG-DASH manifest, or based on a similar logic from the Media Playlist. The derivation of the segment URL is then done as defined in the MPEG-DASH specification, ISO/IEC 23009-1 combining the replacing the template fields $RepresentationID$ strings and the $Time$ or $Number$ strings with the values derived for the template fields.

Figure 3:
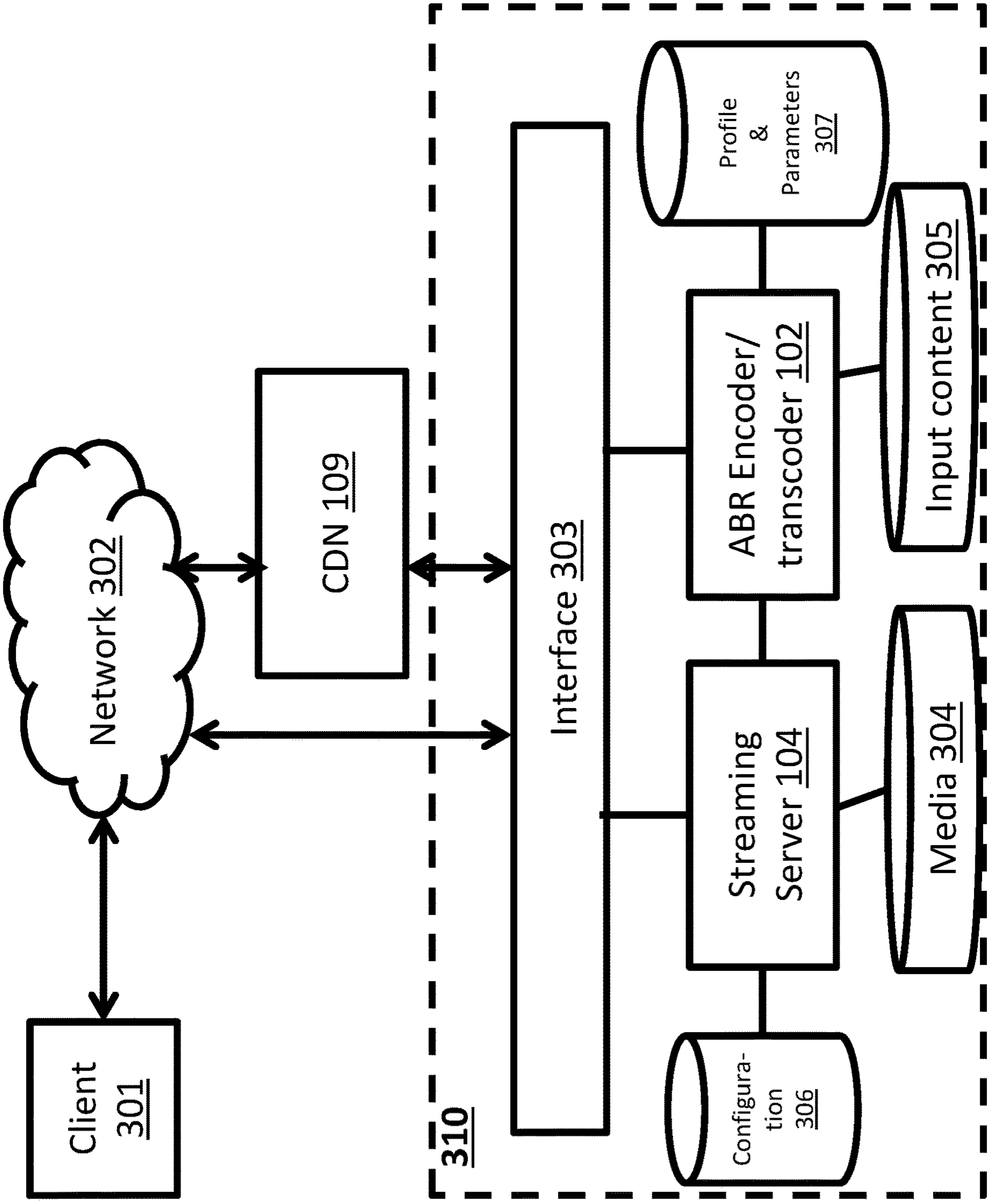
FIG. 3 illustrates an example subsystem for adaptive streaming packaging transcoding and adaptive streaming that can be utilized in accordance with various embodiments.
Figure 6:
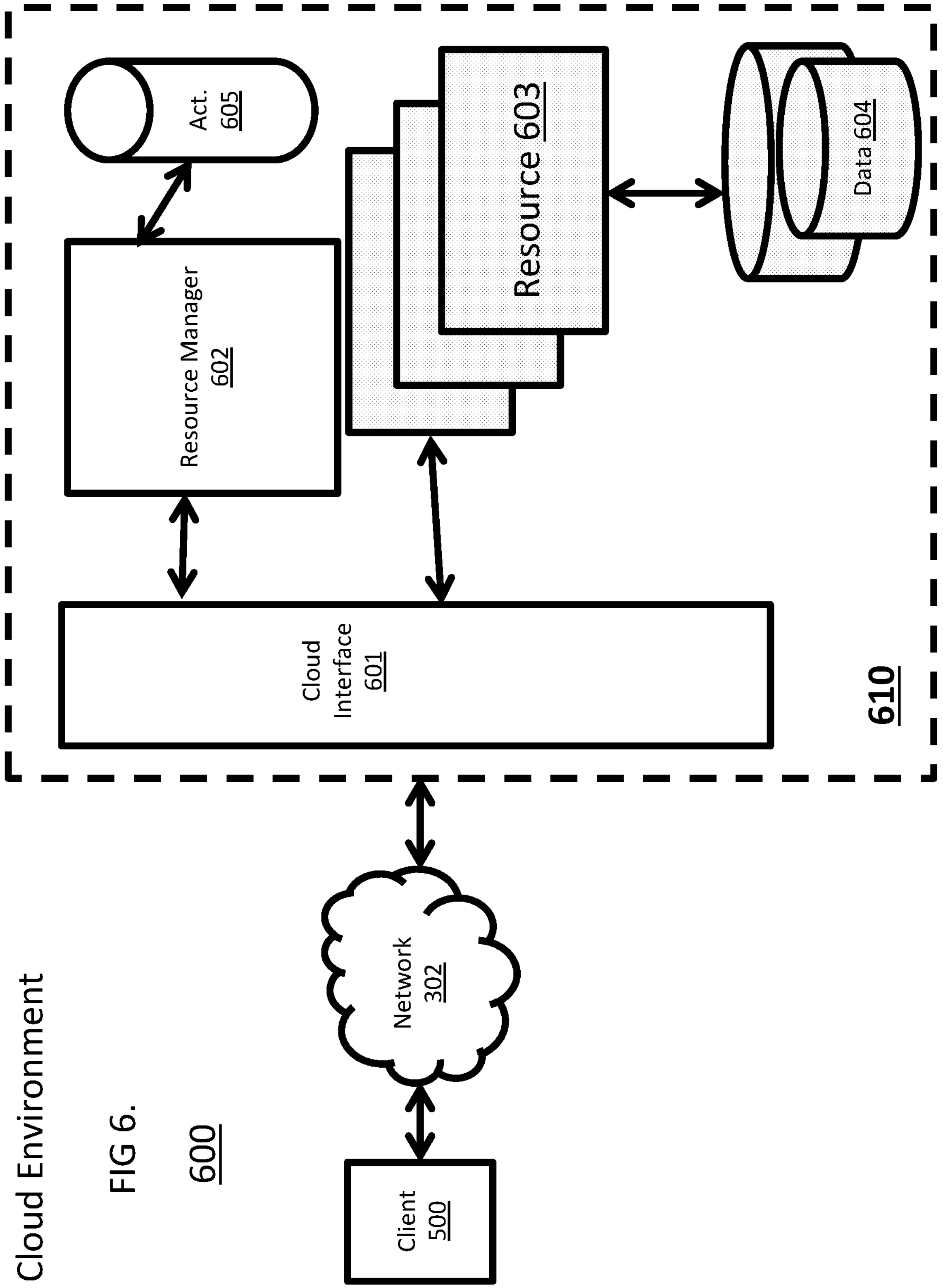
FIG. 6 illustrates an example computational environment for deploying a distributed media presentation generation system, using shared computational resources, such as cloud computing in accordance with the embodiments.

Distributed adaptive streaming packagers 106 potentially embedded in origin servers 104 generate one or more media streaming presentations, FIG. 3 illustrates an example system 300 that can be used to implement aspects of the various embodiments, in an electronic environment such as that discussed with respect to FIG. 6. In the system 300 of FIG. 3, a client computing device 301 can submit a request for content across at least one network 302 to be received by a content provider environment or system 310. As mentioned, in at least some embodiments the request can include a request for content to be displayed on the computing device 500 of FIG. 5 or other client devices, and in many cases will include video or other media content that is encoded for presentation on the client device 301. The network(s) 302 can include any appropriate network, such as the Internet, a local area network (LAN), a cellular network, an Ethernet, or other such wired and/or wireless network. A content provider environment 310 can include any appropriate resources for providing content from a resource provider, as may include various servers, data stores, and other such components known or used for providing content from across a network (or from the "cloud"). As mentioned elsewhere herein, the client computing device 301 can be any appropriate computing or processing device, as may include a desktop or notebook computer, smartphone, tablet, wearable computer (i.e., smart watch, glasses, or contacts), set top box, or other such system or device. An interface layer 303, when receiving a request or call, can determine the type of call or request and cause information to be forwarded to the appropriate component or sub-system. For example, a request for content might be forwarded to a streaming server 104 while a request to specify encoding parameters might be forwarded to an Adaptive Bitrate Streaming (ABR) Encoder 102, among other such options. These calls or requests can also come from third parties, although third party providers can also provide at least some of the media content to be stored to a media repository 304 and encoded for display on the client device 301 as discussed herein. Input content 305 can also provide the source of data content via the ABR Encoder 102 and interface 103 and to the client device 301 via network 302 or via CDN 109 and network 302.

In one example, an interface layer 601 of the environment 310 in FIG. 3 or 610 in FIG. 6 receives a call. As known for network environments, the interface layer 601 can include components such as interfaces (e.g., APIs), load balancers, request and/or data routers. If the request is a request for content, such as for a video data stream to be provided to the client device 301 or 500, information for the request can be directed to one or more streaming servers 104, which can obtain the content from a media data store 604 or other such repository to be sent back across the network(s) to the computing device In at least some embodiments a request from an operator, an administrator, a client device 301, a third-party provider, or another such source might include a request to specify one or more sets of encoding parameters to be used with a media file. Accordingly, information regarding the encoding parameters can be provided to a ABR Encoder 102, or other such component or service, that is able to receive the information through an appropriate interface (i.e., an API or console) and cause the profile and parameter data to be stored to appropriate repositories 307 as discussed elsewhere herein.

When a request for a video file is received, the streaming server 104 can use the profile and parameter data 307 to determine the appropriate encoding information, and can pass that to one or more ABR encoders 102, which can obtain the media file from media data store 304 (or from input content 305) and encode the media file per the encoding information, which can then be provided to the client device 301 by the streaming server 104 or other such component.

A streaming server 104 can be an origin active bitrate video HTTP server. The encoder/packager can receive a signal (e.g., request) and send a signal (e.g., response). The signal request can represent a data request (e.g., an HTTP request) from one of the client devices 110 forwarded to the origin server by the CDN 109. For example, the signal request may be an HTTP request for the origin server to send digital data to one of the client devices. The signal response may represent a data response from the origin server to be forwarded by the CDN 109 to one of the client devices. For example, the origin server may send the signal response (e.g., data such as the content segments) as a network packet based on the HTTP protocol to one of the client devices. The type, implementation and/or number of responses and/or requests may be varied according to the design criteria of a particular implementation. The streaming server can include a manifest file or list of the available content segments. For example, the manifest file may comprise metadata and/or URLs pointing to the content segments and/or other data. The manifest file may be used by the client devices to request the content segments. A format of the manifest file may be varied according to the design criteria of a particular implementation. The manifest file and/or the content segments may have a respective time-to-live (TTL) value. The TTL value (or property) may be used to ensure certain objects in a network are refreshed. For example, objects in a network may be cached (e.g., throughout the CDN 109). The TTL value may represent an amount of time, a number of requests and/or a hop count before the object is refreshed (e.g., requested/updated from the origin server). The TTL value for the manifest file and/or the content segments may be set by the operator and/or set at the origin server. In a common CDN implementation, various types of content may remain stored on the CDN 109 until the TTL value expires (e.g., content invalidation may take a long time). Generally, the TTL value of the manifest file is less than the TTL value of the content segments. A lower TTL value for the manifest file may allow the manifest file to be refreshed more frequently/often than the content segments (e.g., to update the pointers to the content segments). A comparatively higher TTL value for the content segments may allow the content segments to remain in cache longer (e.g., to reduce a number of requests made to and/or reduce a load on the origin server). The implementation and/or values set for the TTL values of the manifest file and/or the content segments may be varied according to the design criteria of a particular implementation.

The streaming server may be configured to perform a content invalidation. For example, one or more of the content segments may be invalidated. Content invalidation may prevent and/or stop content from being delivered to the client devices. Invalidation may be configured by the operator using expiry modes and time shift buffer depth configuration. The origin server may invalidate the content segments by updating (or manipulating) the manifest file. For example, the manifest file may be updated to no longer point to the content segments. Since the TTL value for the manifest file is relatively low, the manifest file may be refreshed throughout the CDN 109. For example, the client device may request the manifest file and when the TTL value expires for the cached manifest in the various nodes of the CDN 109, the updated manifest file (e.g., the invalidated manifest) may be distributed throughout the CDN 109 to the client device.

Figure 4:
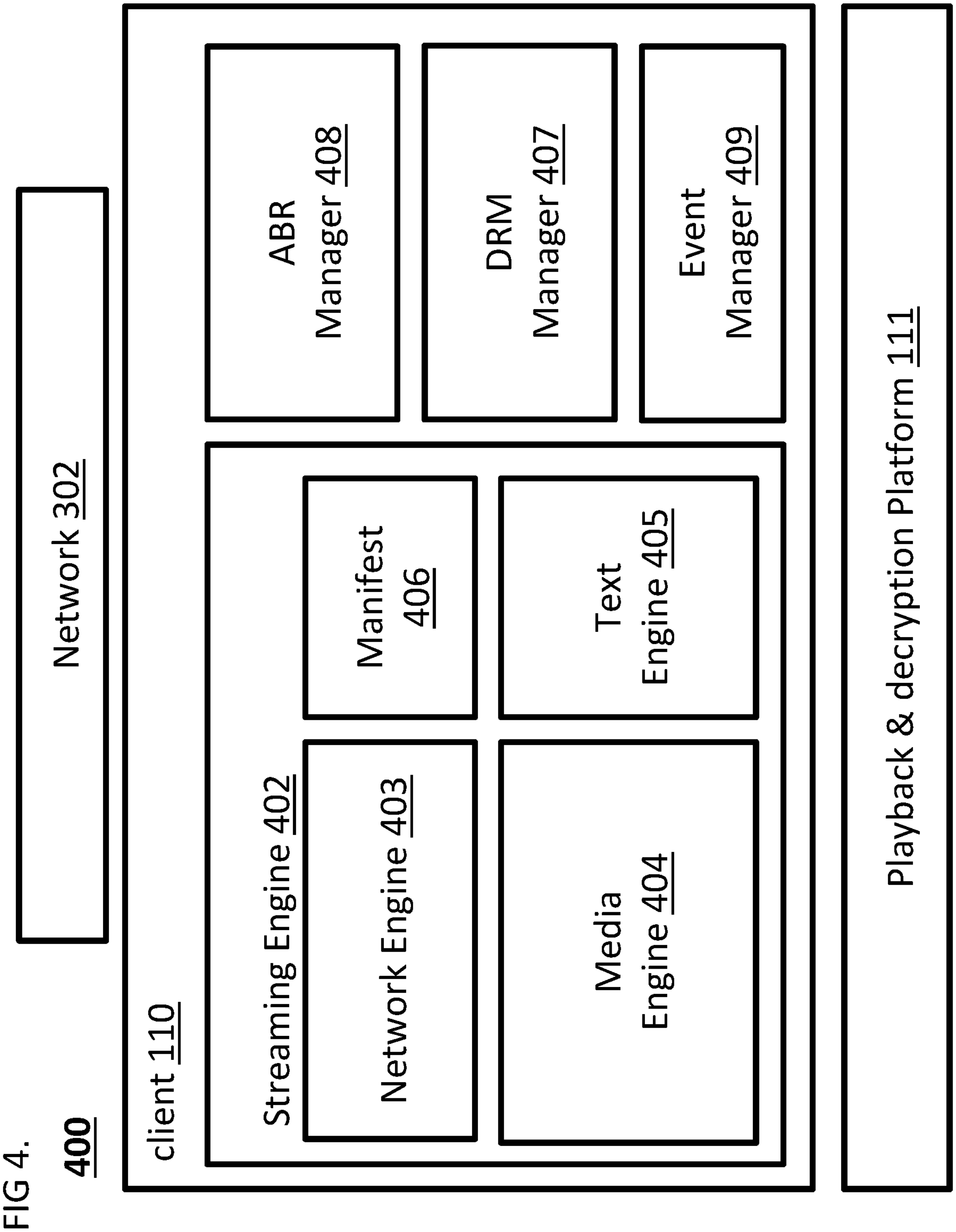
FIG. 4 illustrates the architectural components of a client receiving and requesting an adaptive streaming content in accordance with the embodiments.

FIG. 4 illustrates an example streaming client implementation in an environment or system 400 as used in several embodiments. A network 302 can be used by the DASH client 110 to receive data such as following HTTP requests. Most notably the DASH client 110 keeps track of a streaming manifest 406, and a streaming engine 402 can possess a network engine 403 for making requests for segments and other HTTP(S) requests and a media engine 404 for managing media segments and pushing them to playback at playback and decryption platform 111. The streaming engine 402 can further include a text engine 405 responsible for fetching and rendering text tracks such as tracks based on WebVTT or TTML or other popular subtitle formats such as CEA 608/708. An ABR Manager 408 is responsible for ABR logic such as choosing and selecting bit-rates from adaptation sets in order to achieve high quality playback without stalling for example. A DRM Manager 407 is responsible for fetching license keys and potentially decryption keys for playback of content on the playback and decryption platform 111. Common implementations include Shaka player as developed by Google or dash.js as developed by the DASH industry forum, where many other similar implementation and commercial implementations exists possessing similar functionality. An Event Manager 409 is responsible for handling stream events, in HLS or HTTP Live Streaming, these could be #EXT-X-DATERANGE tags, or in MPEG-DASH these could be Inband events as defined by the DASHEventMessageBox, or MPD Events signaled by an EventStream Element and Event Element in the MPEG-DASH media presentation description. The Event manager 409 is responsible for dispatching events either to applications or to other entity.

FIG. 6 illustrates an example cloud environment 600 in which aspects of the various embodiments can be implemented. In this example a user is able to utilize a client device 110 or 500 to submit requests across at least one network 302 to a resource provider environment 610. The client device can include any appropriate electronic device operable to send and receive requests, messages, or other such information over an appropriate network and convey information back to a user of the device. Examples of such client devices include personal computers, tablet computers, smart phones, notebook computers, and the like. The network 302 can include any appropriate network, including an intranet, the Internet, a cellular network, a local area network (LAN), or any other such network or combination, and communication over the network can be enabled via wired and/or wireless connections. The resource provider environment 610 can include any appropriate components for receiving requests and returning information or performing actions in response to those requests. As an example, the provider environment might include Web servers and/or application servers for receiving and processing requests, then returning data, web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or “cloud computing,” among other such terms and depending upon the specific environment and/or implementation. In this example the provider environment 610 includes a plurality of electronic resources of one or more types. These types can include, for example, application servers operable to process instructions provided by a user or database servers operable to process data stored in one or more data stores or resources 603 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 603 can submit a request that is received to an interface layer 601 of the provider environment 610. The interface layer can include application programming interfaces (APIs) or other exposed interfaces enabling a user to submit requests to the provider environment. The interface layer 601 in this example can also include other components as well, such as at least one Web server, routing components, load balancers, and the like. When a request to provision a resource is received to the interface layer 601, information for the request can be directed to a resource manager 602 or other such system, service, or component configured to manage user accounts and information, resource provisioning and usage, and other such aspects using an account database 605 for example. A resource manager 602 receiving the request can perform tasks such as to authenticate an identity of the user submitting the request, as well as to determine whether that user has an existing account with the resource provider, where the account data may be stored in at least one data store 604 in the provider environment 610. A user can provide any of various types of credentials in order to authenticate an identity of the user to the provider. These credentials can include, for example, a username and password pair, biometric data, a digital signature, or other such information.

The resource provider can validate this information against information stored for the user. If the user has an account with the appropriate permissions, status, etc., the resource manager can determine whether there are adequate resources available to suit the user’s request, and if so, it can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 500 to communicate with an allocated resource without having to communicate with the resource manager 602, at least until such time as a relevant aspect of the user account changes, the user is no longer granted access to the resource, or another such aspect changes.

The resource manager 602 (or another such system or service) in this example can also function as a virtual layer of hardware and software components that handles control functions in addition to management actions, as may include provisioning, scaling, replication, etc. The resource manager 602 can utilize dedicated APIs in the interface layer 601, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 601 in at least one embodiment includes a scalable set of customer-facing servers that can provide the various APIs and return the appropriate responses based on the API specifications. The interface layer 301 (see FIG. 3) also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 7:
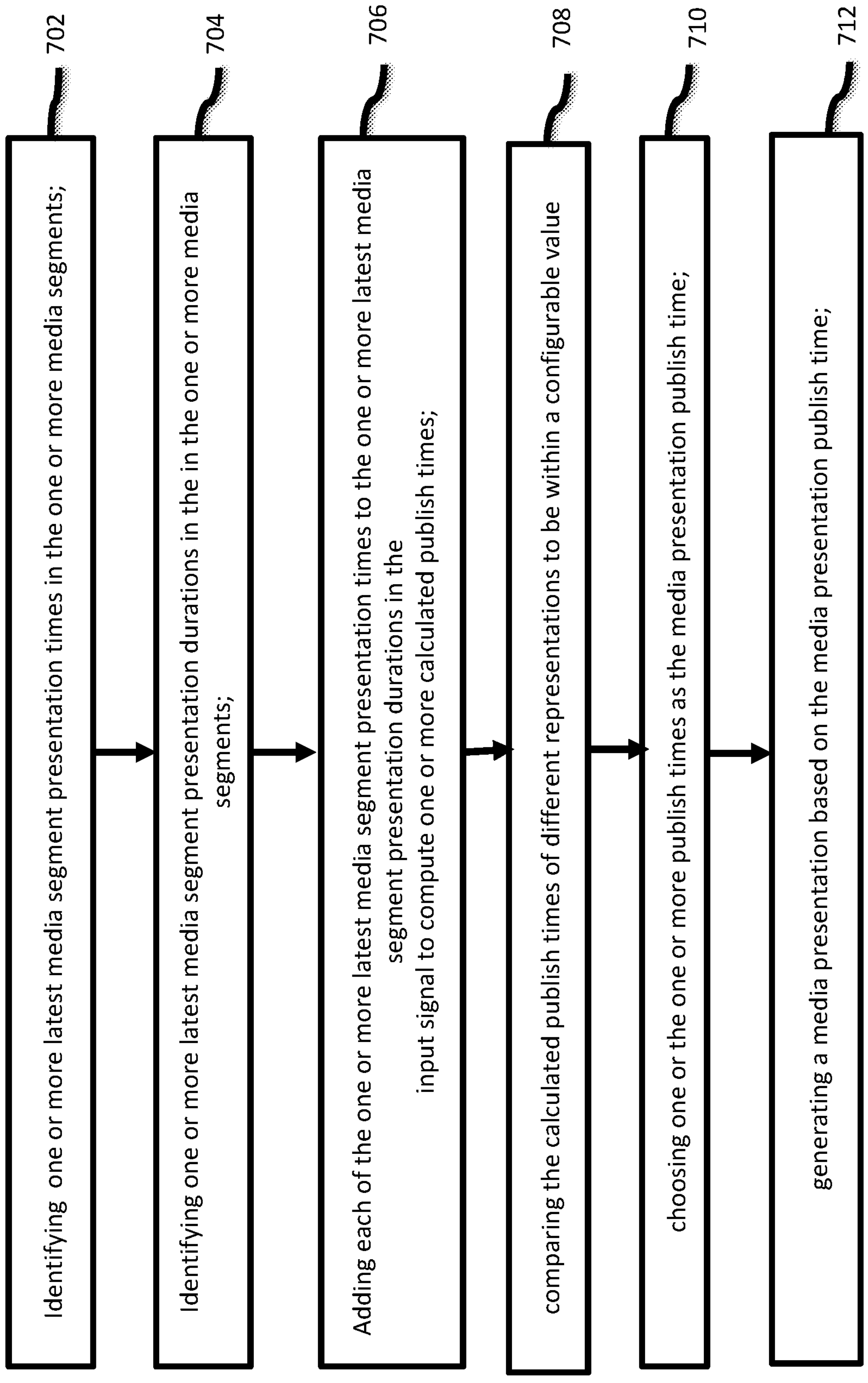
FIG. 7 illustrates the steps involved for distributed redundant media presentation generation in preferred embodiments.

The disclosed method 700 includes the following steps as shown in FIG. 7: 702 Identifying one or more latest media segment presentation times in the one or more media segments; 704 Identifying one or more latest media segment presentation durations in the in the one or more media segments; 706 Adding each of the one or more latest media segment presentation times to the one or more latest media segment presentation durations in the input signal to compute one or more calculated publish times; 708 comparing the calculated publish times of different representations to be within a configurable value; 710 choosing one or the one or more publish times as the media presentation publish time; and 712 generating a media presentation based on the media presentation publish time.

Figure 8:
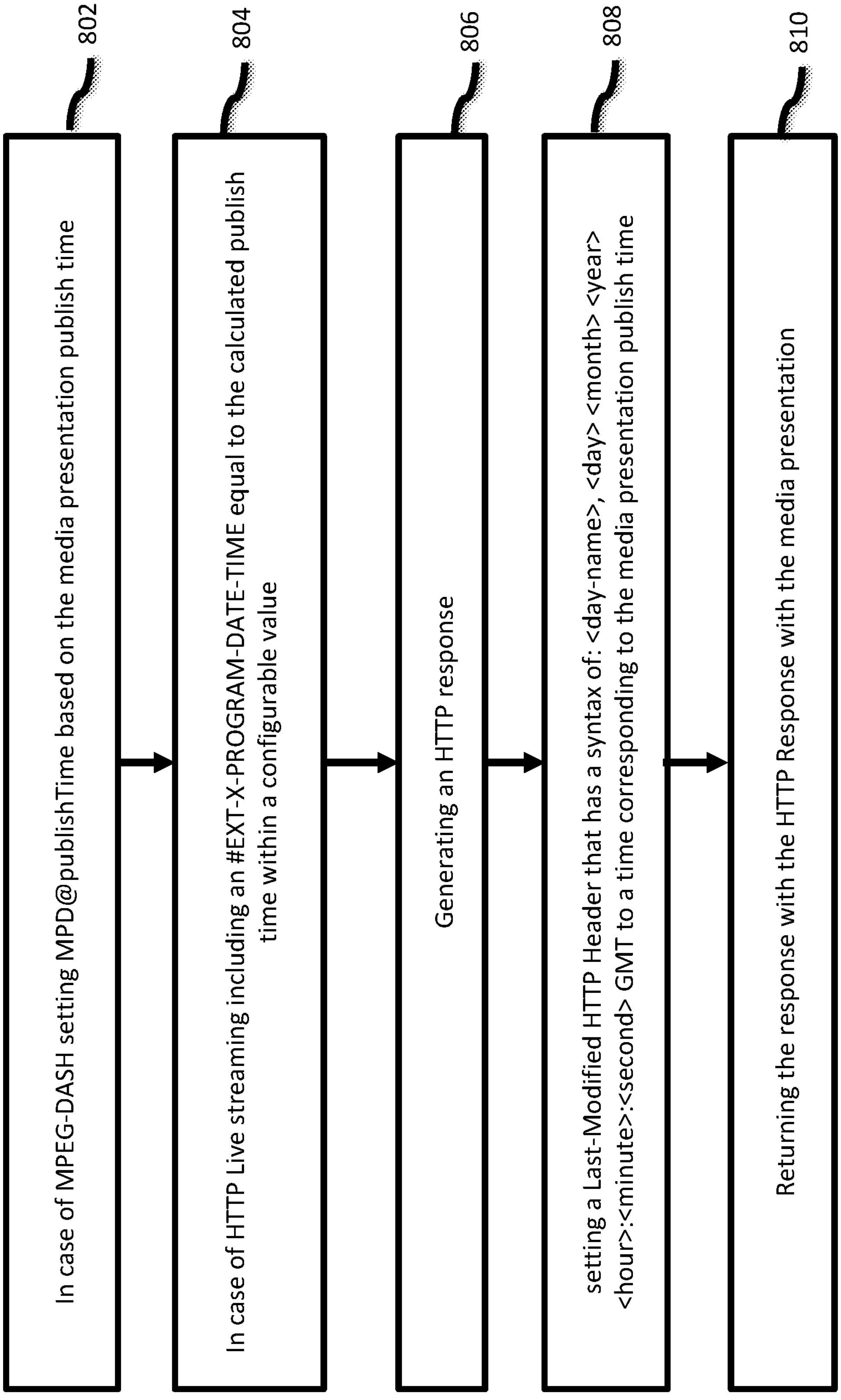
FIG. 8 illustrates the steps involved for distributed redundant media presentation generation in preferred embodiments.

FIG. 8. Illustrates additional steps including the method 800 for generating streaming media presentations. A step for generating a media presentation for MPEG-DASH delivery MPD (D-MPD) includes setting MPD@publishTime based on the calculated publish time in the media presentation description at 802. In case of MPEG-DASH setting MPD@publishTime based on the media presentation publish time, this can be done by converting the calculated publish time to a value to the type="xs:dateTime. The xs:dateTime field follows the following structure: PnYnMnDnTnHnMnS where, P The duration designator, nY is the number of years were n is an unsigned integer that represents the number of years. nM where n is an unsigned integer that represents the number of months. nD where n is an unsigned integer that represents the number of days. T which is the date and time separator nH n is an unsigned integer that represents the number of hours nM where n is an unsigned integer that represents the number of minutes. nS where n is an unsigned decimal that represents the number of seconds. If a decimal point appears, it must be followed by one to twelve digits that represent fractional seconds. For example, the following form indicates a duration of 1 year, 2 months, 3 days, 10 hours, and 30 minutes: P1Y2M3DT10H30M0S A step for generating a media presentation for HTTP Live streaming (in case of HTTP Live Streaming) delivery includes setting an #EXT-X-PROGRAM-DATE-TIME equal to the calculated publish time within a configurable value at 804. For example the tag could be set to the form #EXT-X-PROGRAM-DATE-TIME:2022-11-22T14:18:54.720000Z, following the structure YYYY-MM-DDTHH:MM:SS.mmmZ where YYYY it the year, MM the month, DD the day, HH the hours, MM the minutes SS the seconds and mmm the milliseconds.

An additional step comprises generating an HTTP response at 806 and setting a Last-Modified HTTP Header that has a syntax of: <day-name>, <day> <month> <year> <hour>:<minute>:<second> GMT to a time corresponding to the media presentation publish time at 808. A last step 810 can include returning an HTTP response that includes the media presentation.

FIG. 9. Illustrates an example MPEG-DASH manifest generated by the adaptive streaming packager in output for preferred embodiments. FIG. 9 shows the MPEG-DASH Manifest description with the embedded XML elements 900, as disclosed in the embodiments. MPD@publishTime 902 is set to a value corresponding to the latest media presentation time in the segment template 904, which is (80118102159360+313*92160)/48000=1669127729.28 seconds since 00:00 1-1-1970 (excluding leap seconds), which equates to 2022-11-22T14:35:29.280000Z shown as an XML comment 906.

FIG. 10. Illustrates an exemplary HTTP Live Streaming media playlist 1000 generated according to a preferred embodiment disclosed herein. As can be seen both the tags #X-TIMESTAMP-MAP:MPEGTS=630879904,LOCAL=2022-11-22T14:18:54.720000Z 1002 and #EXT-X-PROGRAM-DATE-TIME:2022-11-22T14:18:54.720000Z 1004 are set according the format and following the corresponding media presentation time wrapped in the mpeg-2 TS segment as 33 bit integer.

FIG. 11. Illustrates exemplary common media application format or MPEG-DASH or fmp4 HTTP live streaming segments 1100. The segments may contain the segmentType (Styp) box. The segments may contain the producerReferenceTimeBox 1101 containing the time the file was written to disk. The media segment contains the MovieFragment Box 'moof' 1102 containing a traf box 1103 and a TrackFragmentDecodeTime Box 'tfdt' box containing the baseMediaDecodeTime which is set to K*D*segmenttimescale 1104. The segment sequences continuous media segments with increasing baseMediaDecodeTime (K+1)*D*segmenttimescale and (K+2)*segmenttimescale etc. Only in case of a variation of a segment the segment duration to d may be set as 2D−d.

As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a result listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

FIG. 5 shows the various embodiments can be further implemented in a wide variety of operating environments in an information processing system, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Various embodiments of the present disclosure can be implemented on an information processing system. The information processing system is capable of implementing and/or performing any of the functionality set forth above. Any suitably configured processing system can be used as the information processing system in embodiments of the present disclosure. The information processing system is operational with numerous other general purpose or special purpose computing system environments, networks, or configurations. Examples of well-known computing systems, environments, and/or configurations that may be suitable for use with the information processing system include, but are not limited to, personal computer systems, server computer systems, thin clients, hand-held or laptop devices, notebook computing devices, multiprocessor systems, mobile devices, microprocessor-based systems, set top boxes, programmable consumer electronics, network PCs, minicomputer systems, mainframe computer systems, Internet-enabled television, and distributed cloud computing environments that include any of the above systems or devices, and the like. The information processing systems contemplated herein include media streaming devices such as smart televisions, tablet computers, personal computers, media streaming servers, content delivery networks or other components with similar functionality for transmitting, receiving and processing of media streaming content. The media streaming device can also include a parser device which can include a device such as a file reader, java-script based parser, that can extract the ISO Base Media file Format structures to read them into the computer memory and use them for generating instructions for the processor. Again, a media streaming device as contemplated in various embodiments herein can be any device dealing with streaming media either actively or passively. They could be origin servers or packagers that are used for formatting live encoded media, or alternatively embedded in devices such as smart phones, televisions, ipads, or other consumer electronics receiving the track for rendering the media presentation, TV Channel or any other associated media tracks. As noted previously, the data processing can be any number of data processing techniques suited for the identifying, enclosing, storing, transmitting, receiving, formatting, converting, multiplexing, de-multiplexing, slicing, presenting, providing controlled access or authentication, tracking, logging or counting or any other function contemplated herein in any setting or environment.

For example, a user with a mobile device may be in communication with a server configured to implement the system using the aforementioned elements, according to an embodiment of the present disclosure. The mobile device can be, for example, a multi-modal wireless communication device, such as a "smart" phone, configured to store and execute mobile device applications ("apps"). Such a wireless communication device communicates with a wireless voice or data network using suitable wireless communications protocols assuming the networks have the appropriate bandwidth to present data or real time images. Alternatively, the display system can be a computing and monitoring system with or without wireless communications as the case may be.

The system may include, inter alia, various hardware components such as processing circuitry executing modules that may be described in the general context of computer system-executable instructions, such as program modules, being executed by the system. Generally, program modules can include routines, programs, objects, components, logic, data structures, and so on that perform particular tasks or implement particular abstract data types. The modules may be practiced in various computing environments such as conventional and distributed cloud computing environments where tasks are performed by remote processing devices that are linked through a communications network. In a distributed cloud computing environment, program modules may be located in both local and remote computer system storage media including memory storage devices. Program modules generally carry out the functions and/or methodologies of embodiments of the present disclosure, as described above.

In some embodiments, a system includes at least one memory and at least one or more processor of a computer system communicatively coupled to the at least one memory. The at least one processor can be configured to perform a method including methods described above.

According to yet another embodiment of the present disclosure, a computer readable storage medium comprises computer instructions which, responsive to being executed by one or more processors, cause the one or more processors to perform operations as described in the methods or systems above or elsewhere herein.

FIG. 5 shows an information processing system 501 of a system 200 or 500 that can be communicatively coupled with the data processing module 550 and a group of client or other devices, or coupled to a presentation device for display at any location at a terminal or server location. According to this example, at least one processor 502, responsive to executing instructions 507, performs operations to communicate with the processing module 550 via a bus architecture 508, as shown. The at least one processor 502 is communicatively coupled with main memory 504, persistent memory 506, and a computer readable medium 520. The processor 502 is communicatively coupled with an Analysis & Data Storage 515 that, according to various implementations, can maintain stored information used by, for example, the data processing module 550 and more generally used by the information processing system 200 or 500. The data processing module 550 can be coupled to one or more sensors 552 as needed. Such sensors can be timers, barcode scanners, fingerprint readers, proximity sensors, microphones, cameras, video cameras, location sensors, motion detectors, biometric reading devices (e.g., iris scanners, facial recognition scanners, voice detection devices) and other devices as contemplated herein. Optionally, this stored information can be received from the client or other devices. For example, this stored information can be received periodically from the client devices and updated or processed over time in the Analysis & Data Storage 515. Additionally, according to another example, a history log can be maintained or stored in the Analysis & Data Storage 515 of the information processed over time. The data processing module 550, and the information processing system 500, can use the information from the history log such as in the analysis process and in making decisions related methods disclosed herein.

The computer readable medium 520, according to the present example, can be communicatively coupled with a reader/writer device (not shown) that is communicatively coupled via the bus architecture 508 with the at least one processor 502. The instructions 507, which can include instructions, configuration parameters, and data, may be stored in the computer readable medium 520, the main memory 504, the persistent memory 506, and in the processor's internal memory such as cache memory and registers, as shown.

The information processing system 500 includes a user interface (or interfaces) 510 that comprises a user output interface 512 and user input interface 514. Examples of elements of the user output interface 512 can include a display, a speaker, one or more indicator lights, one or more transducers that generate audible indicators, and a haptic signal generator or any of the interfaces illustrated or discussed with respect to the figures or elsewhere in the application. Examples of elements of the user input interface 514 can include a keyboard, a keypad, a mouse, a track pad, a touch screen, a touch pad, a microphone that receives audio signals, a camera, a video camera, a CT-Scanner, or any other scanner that scans images. Some user inputs can be sensors or vice-versa. The received audio signals or scanned images, for example, can be converted to electronic digital representations and stored in memory, and optionally can be used with corresponding voice or image recognition software executed by the processor 502 to receive user input data and commands, or to receive test data for example.

A network interface device 516 is communicatively coupled with the at least one processor 502 and provides a communication interface for the information processing system 500 to communicate via one or more networks 302 (See FIGS. 3 and 4). The networks 302 can include wired and wireless networks, and can be any of local area networks, wide area networks, or a combination of such networks. For example, wide area networks including the internet and the web can inter-communicate the information processing system 500 with other one or more information processing systems that may be locally, or remotely, located relative to the information processing system 500. It should be noted that mobile communications devices, such as mobile phones, Smart phones, tablet computers, lap top computers, and the like, which are capable of at least one of wired and/or wireless communication, are also examples of information processing systems within the scope of the present disclosure. The network interface device 516 can provide a communication interface for the information processing system 500 to access the at least one database 517 according to various embodiments of the disclosure.

The instructions 507, according to the present example, can include instructions for monitoring, instructions for analyzing, instructions for retrieving and sending information and related configuration parameters and data. It should be noted that any portion of the instructions 507 can be stored in a centralized information processing system or can be stored in a distributed information processing system, i.e., with portions of the system distributed and communicatively coupled together over one or more communication links or networks.

What is claimed is:

1. A method for generating one or more media presentations, the method comprising:

Identifying one or more media segments in one or more input signals;

identifying one or more latest media segment presentation times in the one or more media segments;

identifying one or more latest media segment presentation durations in the in the one or more media segments;

adding each of the one or more latest media segment presentation times to the one or more latest media segment presentation durations in the input signal to compute one or more calculated publish times;

choosing one of the one or more calculated publish times as the media presentation publish time; and generating a media presentation based on the media presentation publish time.

2. The method of claim 1, wherein the media presentation is an MPEG-DASH media presentation description and the media presentation publish time is set as the MPD@publishTime.

3. The method of claim 1, wherein the step of generating the media presentation results in a common media application format presentation.

4. The method of claim 1, wherein the step of identifying the one or more latest media segment presentation times includes adding a synchronization timestamp (STS).

5. The method of claim 1, wherein the step of generating the one or more media presentations also comprises the step of setting a Last-Modified HTTP Header that has a syntax of: <day-name>, <day> <month> <year> <hour>:<minute>:<second> GMT to a time corresponding to the media presentation publish time.

6. The method of claim 1, the method further comprises the step of comparing the calculated publish times of different representations to be within a configurable value.

7. The method of claim 1 further comprising the step of generating a media presentation description includes the step of applying one or more redundant encoding and packaging constraints.

8. The method of claim 1 further comprising encrypting the one or more media segments in the input signal using common encryption.

9. The method of claim 1, wherein the step of generating the media presentation results in a generation of an HTTP Live Streaming presentation.

10. The method of claim 9, wherein the step of generating the media presentation also comprises setting one or more #EXT-X-PROGRAM-DATE-TIME to the calculated publish time.

11. The method of claim 9, wherein the step of generating the media presentation also includes wrapping the one or more media segment presentation times in a 33 bits MPEG-2 TS presentation time stamp.

12. The method of claim 11, wherein the step of generating the media presentation also comprises writing one or more #X-TIMESTAMP-MAP=MPEGTS:<MPEG-2 time>, LOCAL=YYYY-MM-DDTHH:MM:SS.mmmZ to map the MPEG-2 transport stream time to the one or more media segment presentation times.

13. The method of claim 9, wherein the step of generating the media presentation also comprises writing one or more URL's indicated under an #EXTINF tag following a naming structure that can be expressed using a SegmentTemplate@media.

14. The method of claim 1, wherein the step of generating the media presentation also comprising writing one or more ProducerReferenceTimeBoxes to indicate when a media segment was written to disk.

15. The method of claim 1, wherein the step of generating the one or more media presentations also comprises the step of adding an additional HTTP header with a checksum.

16. A system for redundant media presentation generation by one or more distributed adaptive streaming packagers, the system comprising:

a plurality of adaptive streaming packagers having one or more processors and memory having computer instructions which when executed by the one or more processors cause the one or more processor to perform the functions of:

identifying one or more media segments in one or more input signals;

identifying one or more latest media segment presentation times in the one or more media segments;

identifying one or more latest media segment presentation durations in the in the one or more media segments;

adding each of the one or more latest media segment presentation times to each of the one or more latest media segment presentation durations in the input signal to compute one or more calculated publish times;

choosing one of the one or more calculated publish times as the media presentation publish time; and generating a media presentation based on the media presentation publish time.

17. The system of claim 16, wherein the computer instructions cause the one or more processors to perform the function of setting a Last-Modified HTTP Header that has a syntax of: <day-name>, <day> <month> <year> <hour>:<minute>:<second> GMT to a time corresponding to the media presentation publish time.

18. The system of claim 16, wherein the one or more distributed adaptive streaming packagers are deployed on geographically distributed locations.

19. The system of claim 16, wherein the system forms a part of a cloud-based services system.

20. The system of claim 16, wherein the receiver comprises a streaming origin server that combines packager and origin functions and further comprises a content delivery network coupled to a digital rights management system.

* * * * *